(12) United States Patent
Yang et al.

(10) Patent No.: US 11,665,636 B2
(45) Date of Patent: *May 30, 2023

(54) METHOD FOR SELECTING ACCESS NETWORK TYPE, DEVICE, AND SYSTEM

(71) Applicant: HUAWEI TECHNOLOGIES CO., LTD., Guangdong (CN)

(72) Inventors: Jiao Yang, Xi'an (CN); Yan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/486,614

(22) Filed: Sep. 27, 2021

(65) Prior Publication Data
US 2022/0015027 A1 Jan. 13, 2022

Related U.S. Application Data

(63) Continuation of application No. 16/692,428, filed on Nov. 22, 2019, now Pat. No. 11,134,436, which is a
(Continued)

(30) Foreign Application Priority Data
May 25, 2017 (CN) .......................... 201710380367.4

(51) Int. Cl.
H04W 8/20 (2009.01)
H04W 48/18 (2009.01)
(Continued)

(52) U.S. Cl.
CPC ............. H04W 48/18 (2013.01); H04W 8/20 (2013.01); H04W 36/0022 (2013.01);
(Continued)

(58) Field of Classification Search
CPC ... H04W 48/18; H04W 8/20; H04W 36/0022; H04W 36/22; H04W 48/06; H04W 48/16; H04W 36/32; H04W 48/08; H04W 36/14
See application file for complete search history.

(56) References Cited

U.S. PATENT DOCUMENTS

| 11,134,436 B2* | 9/2021 | Yang | ................ | H04W 36/0022 |
| 2010/0014426 A1* | 1/2010 | Cavalli | ................ | H04W 36/22 370/235 |

(Continued)

FOREIGN PATENT DOCUMENTS

| CN | 103533612 | 1/2014 |
| CN | 103857011 | 6/2014 |

(Continued)

OTHER PUBLICATIONS

3GPP TR 23.705 V13.0.0 (Dec. 2014), "3rd Generation Partnership Project; Technical Specification Group Services and System Aspects; Study on system enhancements for user plane congestion management (Release 13)," Dec. 2014, 61 pages.
(Continued)

Primary Examiner — Julio R Perez
(74) Attorney, Agent, or Firm — Fish & Richardson P.C.

(57) ABSTRACT

Embodiments of this application provide a method for selecting an access network type, a device, and a system, to flexibly select an access network type. An example method includes: determining, by a policy control function PCF entity, that a network status of a first network does not meet a preset condition, where the first network is a network currently accessed by a terminal; and sending, by the PCF entity, an access network type corresponding to a second network to the terminal, where the access network type corresponding to the second network is used to instruct the terminal to redirect a session of the terminal to the second
(Continued)

network, and the second network is a network other than the first network.

20 Claims, 15 Drawing Sheets

Related U.S. Application Data continuation of application No. PCT/CN2018/076083, filed on Feb. 9, 2018.

(51) Int. Cl.
    *H04W 36/00* (2009.01)
    *H04W 36/22* (2009.01)
    *H04W 48/06* (2009.01)
    *H04W 48/16* (2009.01)
(52) U.S. Cl.
    CPC .......... *H04W 36/22* (2013.01); *H04W 48/06* (2013.01); *H04W 48/16* (2013.01)

(56) References Cited

U.S. PATENT DOCUMENTS

| | | | |
|---|---|---|---|
| 2014/0029420 A1 | 1/2014 | Jeong et al. | |
| 2014/0038606 A1* | 2/2014 | Jang | H04W 48/06 |
| | | | 455/436 |
| 2014/0273922 A1 | 9/2014 | Mcmurry et al. | |
| 2014/0307550 A1 | 10/2014 | Forssell et al. | |
| 2015/0043447 A1 | 2/2015 | Stojanovski et al. | |
| 2015/0245238 A1* | 8/2015 | Zhang | H04W 28/0215 |
| | | | 370/230 |
| 2015/0288529 A1 | 10/2015 | Kekki | |
| 2016/0135219 A1 | 5/2016 | Jain et al. | |
| 2016/0205693 A1 | 7/2016 | Lu et al. | |
| 2017/0026824 A1* | 1/2017 | Kim | H04W 76/12 |
| 2020/0053562 A1* | 2/2020 | Kim | H04W 12/062 |
| 2020/0092802 A1* | 3/2020 | Yang | H04W 36/22 |
| 2020/0267596 A1* | 8/2020 | Sudarsan | H04W 72/0486 |

FOREIGN PATENT DOCUMENTS

| | | |
|---|---|---|
| CN | 104349386 | 2/2015 |
| CN | 104509173 | 4/2015 |
| CN | 104770015 | 7/2015 |
| CN | 105578526 | 5/2016 |
| EP | 2919529 | 9/2015 |
| WO | 2014182341 | 11/2014 |
| WO | WO-2019097498 A1 * | 5/2019 |

OTHER PUBLICATIONS

Ericsson, "Discussion Paper on UE Policy provisioning from the PCF to the UE," SA WG2 Meeting #119, S2-170800, Dubrovnik, Croatia, Feb. 13-17, 2017, 3 pages.
Extended European Search Report issued in European Application No. 1880568.8 dated Jan. 9, 2020, 12 pages.
Huawei, Hisilicon, "TS 23.501: Provision of UE policy from PCF to UE," SA WG2 Meeting #120, S2-172255, Busan, South Korea, Mar. 27-31, 2017, 4 pages.
Huawei, HiSilicon, "TS 23.501: Provisioning of policy from PCF to UE," SA WG2 Meeting #119, S2-171086, Dubrovnik, HR, Feb. 13-17, 2017, 7 pages.
Huawei, HiSilicon, China Mobile, "Discussion on Services provided by PCF," SA WG2 Meeting #120, S2-172256, Busan, South Korea, Mar. 27-31, 2017, 8 pages.
Huawei, HiSilicon, China Mobile, "TS 23.501: Services provided by PCF," SA WG2 Meeting #119, S2-171088, Dubrovnik, HR, Feb. 13-17, 2017, 9 pages.
LG Electronics, "TS 23.501: Update of clause 5.6.5 Support for connecting to a local area data network—Consideration on PCF based solution," SA WG2 Meeting #119, S2-170846, Dubrovnik, Croatia, Feb. 13-17, 2017, 3 pages.
LG Electronics, "TS 23.502: Clarification on handover between 3GPP and N3GPP," SA WG2 Meeting #121, Hangzhou, China, XP051281882, May 15-19, 2017, S2-173390, 8 pages.
Office Action issued in Chinese Application No. 201710380367.4 dated Dec. 4, 2019, 19 pages (with English translation).
PCT International Search Report and Written Opinion issued in PCT/CN2018/076083 dated Apr. 27, 2018, 15 pages (with English translation).
Vodafone, "PCF NF services," SA WG2 Meeting #121, S2-173071, Hangzhou, P.R. China, XP051281580, May 15-19, 2017, 5 pages.
Extended European Search Report issued in European Application No. 21180085.9 dated Dec. 15, 2021, 11 pages.

* cited by examiner

FIG. 1
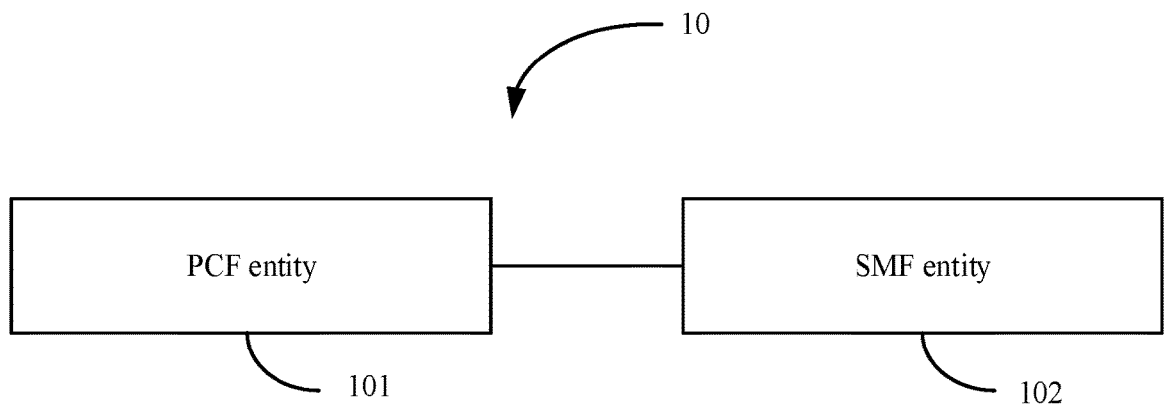
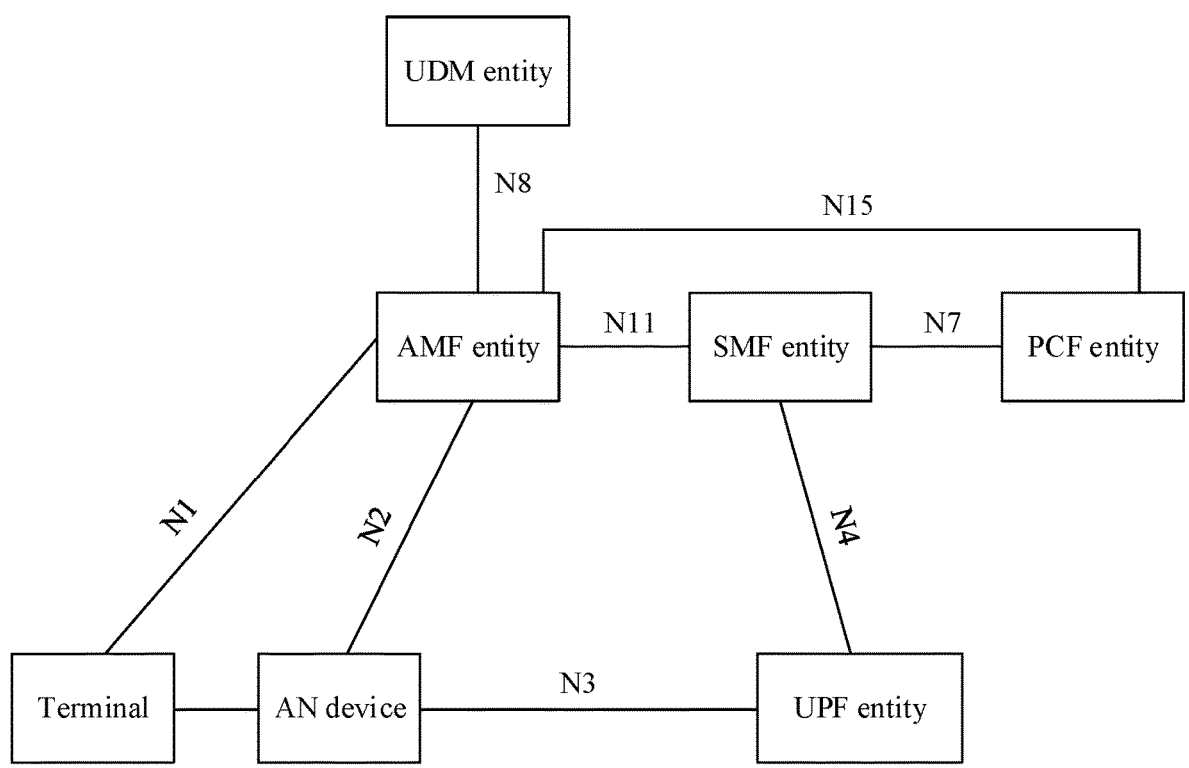
FIG. 2

METHOD FOR SELECTING ACCESS NETWORK TYPE, DEVICE, AND SYSTEM

CROSS-REFERENCE TO RELATED APPLICATIONS

This application is a continuation of U.S. patent application Ser. No. 16/692,428, filed on Nov. 22, 2019, now U.S. Pat. No. 11,134,436, which is a continuation of International Application No. PCT/CN2018/076083, filed on Feb. 9, 2018, which claims priority to Chinese Patent Application No. 201710380367.4, filed on May 25, 2017. All of the aforementioned patent applications are hereby incorporated by reference in their entireties.

TECHNICAL FIELD

This application relates to the field of communications technologies, and in particular, to a method for selecting an access network type, a device, and a system.

BACKGROUND

To address challenges from wireless broadband technologies and maintain a pioneering advantage of 3rd generation partnership project (3GPP) networks, the 3GPP standard organization formulated a network architecture of a next generation mobile communications system (next generation system), which is referred to as a 5th generation (5G) network architecture, at the end of 2016. This architecture not only supports a wireless technology defined in the 3GPP standard organization in accessing a 5G core network, but also supports a non-3GPP access technology in accessing a 5G core network.

Currently, when a terminal needs to access a 5G core network, usually, after receiving an access network discovery information request from the terminal, an access network discovery and selection function (ANDSF) entity sends a correspondence between terminal location information and an access network type to the terminal, and the terminal selects, based on the correspondence and a current location of the terminal, a 3GPP network or a non-3GPP network for access. However, the method for selecting an access network type is not flexible, and consequently, the selected access network type may be inappropriate. Therefore, how to flexibly select an access network type is an urgent problem to be resolved currently.

SUMMARY

Embodiments of this application provide a method for selecting an access network type, a device, and a system, to flexibly select an access network type.

To achieve the foregoing objective, the embodiments of this application provide the following technical solutions.

According to a first aspect, an embodiment of this application provides a method for selecting an access network type. The method includes: determining, by a policy control function PCF entity, that a network status of a first network does not meet a preset condition, where the first network is a network currently accessed by a terminal; and sending, by the PCF entity, an access network type corresponding to a second network to the terminal, where the access network type corresponding to the second network is used to instruct the terminal to redirect a session of the terminal to the second network, and the second network is a network other than the first network. Based on this solution, a network side may select the access network type based on the network status of the network, and redirect the session of the terminal from the first network to the second network when the network status of the first network does not meet the preset condition. In other words, control by the network side over selection of the access network type by the terminal is enhanced, and the access network type is more flexibly selected by the terminal. Therefore, a problem in the prior art that a selected access network type is inappropriate because network access is selected based on a current location of a terminal, and consequently, subsequent communication efficiency may be reduced can be avoided to some extent.

In a possible design, the network status includes at least one of a congestion status or a quota. The congestion status includes being congested or not being congested. The quota refers to traffic that can be used by a user in a specified period or in a session.

In a possible design, before the sending, by the PCF entity, an access network type corresponding to a second network to the terminal, the method further includes: obtaining, by the PCF entity, a network status of the second network, and determining that the network status of the second network meets the preset condition. Because the network status of the second network meets the preset condition, a problem in the prior art that a selected access network type is inappropriate because network access is selected based on a current location of a terminal can be avoided, so that subsequent communication efficiency can be improved.

In a possible design, the method further includes: obtaining, by the PCF entity, location information of the terminal; and learning, by the PCF entity based on the location information of the terminal, that the second network covers a current location of the terminal. In other words, in this embodiment of this application, when learning that the second network covers the current location of the terminal, the PCF entity may send the access network type corresponding to the second network to the terminal, thereby increasing a probability for the terminal to successfully access the network.

In a possible design, the learning, by the PCF entity based on the location information of the terminal, that the second network covers a current location of the terminal includes: sending, by the PCF entity, a request message to a unified data management UDM entity, where the request message includes the location information of the terminal and is used to request access network type information for the current location of the terminal; receiving, by the PCF entity, a response message from the UDM entity, where the response message includes the access network type information for the current location of the terminal; and learning, by the PCF entity based on the access network type information for the current location of the terminal, that the second network covers the current location of the terminal. In this manner, the PCF entity can learn that the second network covers the current location of the terminal.

In a possible design, the obtaining, by the PCF entity, location information of the terminal includes: receiving, by the PCF entity, the location information of the terminal from a session management function SMF entity; or receiving, by the PCF entity, the location information of the terminal from an access and mobility management function AMF entity. In this manner, the PCF entity obtains the location information of the terminal.

In a possible design, the method further includes: sending, by the PCF entity, a request message to the terminal, where the request message is used to request access network type information for a current location of the terminal; receiving, by the PCF entity, a response message from the terminal, where the response message includes the access network type information for the current location of the terminal; and learning, by the PCF entity based on the access network type information for the current location of the terminal, that the second network covers the current location of the terminal. In this manner, the PCF entity can learn that the second network covers the current location of the terminal.

In a possible design, after the sending, by the PCF entity, an access network type corresponding to a second network to the terminal, the method further includes: receiving, by the PCF entity, a first message from the terminal, where the first message is used to indicate whether the terminal has detected the second network; and if the PCF entity determines, based on the first message, that the terminal has detected the second network, sending, by the PCF entity, a second message to the terminal, where the second message is used to instruct the terminal to redirect the session of the terminal to the second network. When determining that the terminal has detected the second network, the PCF entity instructs the terminal to redirect the session of the terminal to the second network. Therefore, a probability for the terminal to successfully access the network can be increased.

According to a second aspect, an embodiment of this application provides a method for selecting an access network type. The method includes:

receiving, by a session management function SMF entity, an access network type corresponding to a second network from a policy control function PCF entity; and sending, by the SMF entity, the access network type corresponding to the second network to the terminal, where the access network type corresponding to the second network is used to instruct the terminal to redirect a session of the terminal to the second network. Based on this solution, the network side may select the access network type based on the network status of the network, and redirect the session of the terminal from the first network to the second network when the network status of the first network does not meet the preset condition. In other words, control by the network side over selection of the access network type by the terminal is enhanced, and the access network type is more flexibly selected by the terminal. Therefore, a problem in the prior art that a selected access network type is inappropriate because network access is selected based on a current location of a terminal, and consequently, subsequent communication efficiency may be reduced can be avoided to some extent.

In a possible design, the second network is a network, other than a first network, in networks that cover a current location of the terminal, and the first network is a network currently accessed by the terminal. In other words, in this embodiment of this application, when learning that the second network covers the current location of the terminal, the PCF entity may send the access network type corresponding to the second network to the terminal by using the SMF entity, thereby increasing a probability for the terminal to successfully access the network.

In a possible design, the second network is a network other than a first network, and the first network is a network currently accessed by the terminal.

In a possible design, after the sending, by the SMF entity, an access network type corresponding to a second network to the terminal, the method further includes: receiving, by the SMF entity, a first message from the terminal, where the first message is used to indicate whether the terminal has detected the second network; and if the SMF entity determines, based on the first message, that the terminal has detected the second network, sending, by the SMF entity, a second message to the terminal, where the second message is used to instruct the terminal to redirect the session of the terminal to the second network. When determining that the terminal has detected the second network, the SMF entity instructs the terminal to redirect the session of the terminal to the second network. Therefore, a probability for the terminal to successfully access the network can be increased.

In a possible design, the method further includes: if a current session and service continuity SSC mode is a first SSC mode, sending, by the SMF entity, first indication information to the terminal, where the first indication information is used to instruct the terminal to redirect the session to the second network after the session is deactivated; or if a current SSC mode is a second SSC mode, sending, by the SMF entity, second indication information to the terminal, where the second indication information is used to instruct to release the session; or if a current SSC mode is a third SSC mode, sending, by the SMF entity, a timing length to the terminal, where the timing length is used to indicate a time for which the session is released.

According to a third aspect, an embodiment of this application provides a policy control function PCF entity, where the PCF entity includes a determining module and a sending module, where the determining module is configured to determine that a network status of a first network does not meet a preset condition, where the first network is a network currently accessed by a terminal; and the sending module is configured to send an access network type corresponding to a second network to the terminal, where the access network type corresponding to the second network is used to instruct the terminal to redirect a session of the terminal to the second network, and the second network is a network other than the first network.

In a possible design, the network status includes at least one of a congestion status or a quota.

In a possible design, the PCF entity further includes an obtaining module, where the obtaining module is configured to: before the sending module sends the access network type corresponding to the second network to the terminal, obtain a network status of the second network; and the determining module is further configured to determine that the network status of the second network meets the preset condition.

In a possible design, the PCF entity further includes an obtaining module, where the obtaining module is configured to obtain location information of the terminal; and the determining module is further configured to learn, based on the location information of the terminal, that the second network covers a current location of the terminal.

In a possible design, the determining module is specifically configured to: send a request message to a unified data management UDM entity, where the request message includes the location information of the terminal and is used to request access network type information for the current location of the terminal; receive a response message from the UDM entity, where the response message includes the access network type information for the current location of the terminal; and learn, based on the access network type information for the current location of the terminal, that the second network covers the current location of the terminal.

In a possible design, the obtaining module is specifically configured to: receive the location information of the terminal from a session management function SMF entity; or the obtaining module is specifically configured to: receive the location information of the terminal from an access and mobility management function AMF entity.

In a possible design, the PCF entity further includes a receiving module, where the sending module is further configured to send a request message to the terminal, where the request message is used to request access network type information for a current location of the terminal; the receiving module is configured to receive a response message from the terminal, where the response message includes the access network type information for the current location of the terminal; and the determining module is further configured to learn, based on the access network type information for the current location of the terminal, that the second network covers the current location of the terminal.

In a possible design, the PCF entity further includes a receiving module, where the receiving module is configured to: receive a first message from the terminal after the sending module sends the access network type corresponding to the second network to the terminal, where the first message is used to indicate whether the terminal has detected the second network; and the sending module is configured to send a second message to the terminal if the determining module determines, based on the first message, that the terminal has detected the second network, where the second message is used to instruct the terminal to redirect the session of the terminal to the second network.

According to a fourth aspect, an embodiment of this application provides a policy control function PCF entity. The PCF entity includes a processor, a memory, a bus, and a communications interface, where the memory is configured to store a computer-executable instruction, the processor is connected to the memory by using the bus, and when the PCF entity is run, the processor executes the computer-executable instruction stored in the memory, so that the PCF entity performs the method for selecting an access network type according to any one of the first aspect.

According to a fifth aspect, an embodiment of this application provides a computer-readable storage medium, configured to store a computer software instruction used by the PCF entity. When the computer software instruction is run on a computer, the computer is enabled to perform the method for selecting an access network type according to any one of the first aspect.

According to a sixth aspect, an embodiment of this application provides a computer program product that includes an instruction. When the computer program product is run on a computer, the computer is enabled to perform the method for selecting an access network type according to any one of the first aspect.

According to a seventh aspect, this application provides a chip system. The chip system includes a processor, configured to support a PCF entity in implementing functions in the foregoing aspects, for example, determining that a network status of a first network does not meet a preset condition. In a possible design, the chip system further includes a memory, where the memory is configured to store a program instruction and data that are necessary for a data sending device. The chip system may include a chip, or may include a chip and another discrete component.

For technical effects brought by any design manner of the third aspect to the seventh aspect, refer to technical effects brought by different design manners of the first aspect. Details are not described herein again.

According to an eighth aspect, an embodiment of this application provides a session management function SMF entity, where the SMF entity includes a receiving module and a sending module, where the receiving module is configured to receive an access network type corresponding to a second network from a policy control function PCF entity; and the sending module is configured to send the access network type corresponding to the second network to the terminal, where the access network type corresponding to the second network is used to instruct the terminal to redirect a session of the terminal to the second network.

In a possible design, the second network is a network, other than a first network, in networks that cover a current location of the terminal, and the first network is a network currently accessed by the terminal.

In a possible design, the second network is a network other than a first network, and the first network is a network currently accessed by the terminal.

In a possible design, the SMF entity further includes a determining module, where the receiving module is further configured to: receive a first message from the terminal after the sending module sends the access network type corresponding to the second network to the terminal, where the first message is used to indicate whether the terminal has detected the second network; and the sending module is further configured to send a second message to the terminal if the determining module determines, based on the first message, that the terminal has detected the second network, where the second message is used to instruct the terminal to redirect the session of the terminal to the second network.

In a possible design, the sending module is further configured to send first indication information to the terminal if a current session and service continuity SSC mode is a first SSC mode, where the first indication information is used to instruct the terminal to redirect the session to the second network after the session is deactivated; or the sending module is further configured to send second indication information to the terminal if a current SSC mode is a second SSC mode, where the second indication information is used to instruct to release the session; or the sending module is further configured to send a timing length to the terminal if a current SSC mode is a third SSC mode, where the timing length is used to indicate a time for which the session is released.

According to a ninth aspect, an embodiment of this application provides a session management function SMF entity. The SMF entity includes a processor, a memory, a bus, and a communications interface, where the memory is configured to store a computer-executable instruction, the processor is connected to the memory by using the bus, and when the SMF entity is run, the processor executes the computer-executable instruction stored in the memory, so that the SMF entity performs the method for selecting an access network type according to any one of the second aspect.

According to a tenth aspect, an embodiment of this application provides a computer-readable storage medium, configured to store a computer software instruction used by the SMF entity. When the computer software instruction is run on a computer, the computer is enabled to perform the method for selecting an access network type according to any one of the second aspect.

According to an eleventh aspect, an embodiment of this application provides a computer program product that includes an instruction. When the computer program product is run on a computer, the computer is enabled to perform the method for selecting an access network type according to any one of the second aspect.

According to a twelfth aspect, this application provides a chip system. The chip system includes a processor, configured to support an SMF entity in implementing functions in the foregoing aspects, for example, determining that a terminal detects a second network. In a possible design, the chip system further includes a memory, where the memory is configured to store a program instruction and data that are necessary for a data sending device. The chip system may include a chip, or may include a chip and another discrete component.

For technical effects brought by any design manner of the eighth aspect to the twelfth aspect, refer to technical effects brought by different design manners of the second aspect. Details are not described herein again.

According to a thirteenth aspect, an embodiment of this application provides a communications system, including the PCF entity according to any one of the foregoing aspects and the SMF entity according to any one of the foregoing aspects.

BRIEF DESCRIPTION OF DRAWINGS

FIG. 1 is a schematic framework diagram of a system for selecting an access network type according to an embodiment of this application;

FIG. 2 is a schematic architectural diagram of a 5G network according to an embodiment of this application;

DESCRIPTION OF EMBODIMENTS

Figure 3:
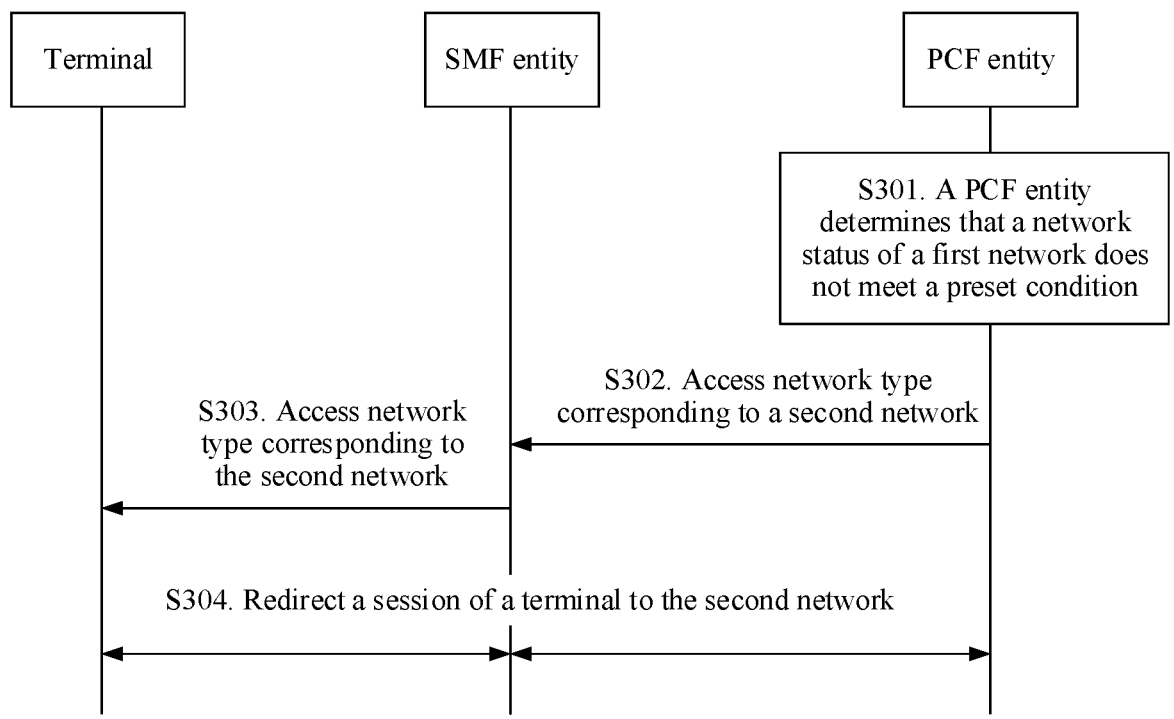
FIG. 3 is a first schematic flowchart of a method for selecting an access network type according to an embodiment of this application.

The following describes the technical solutions in the embodiments of this application with reference to the accompanying drawings in the embodiments of this application. In description of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of this application, "a plurality of" means two or more than two.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of new service scenarios, the technical solutions provided in the embodiments of this application are also applicable to similar technical problems.

FIG. 1 shows a communications system 10 according to an embodiment of this application. The communications system 10 may be used for selection of an access network type. The communications system 10 includes a policy control function (PCF) entity 101 and a session management function (SMF) entity 102.

The PCF entity 101 is configured to: send an access network type corresponding to a second network to the SMF entity 102 after determining that a network status of a first network does not meet a preset condition, where the access network type corresponding to the second network is used to instruct a terminal to redirect a session of the terminal to the second network, and the second network is a network other than the first network.

The SMF entity 102 is configured to: receive the access network type corresponding to the second network from the PCF entity 101, and send the access network type corresponding to the second network to the terminal.

It should be noted that the PCF entity 101 and the SMF entity in FIG. 1 may directly communicate with each other, or may communicate with each other by forwarding by another network device. This is not specifically limited in this embodiment of this application.

For example, the system 10 for selecting an access network type may be applied to a 5G network and a future network. This is not specifically limited in this embodiment of this application.

If the system 10 for selecting an access network type is applied to a 5G network, as shown in FIG. 2, the 5G network may further include an access network (AN) device, a unified data management (UDM) entity, an access and mobility management function (AMF) entity, and a user plane function (UPF) entity.

For example, the terminal communicates with the AMF entity by using a next generation network (Next generation, N) interface 1 (N1 for short), the AN device communicates with the AMF entity by using an N interface 2 (N2 for short), the AN device communicates with the UPF entity by using an N interface 3 (N3 for short), the AMF entity communicates with the UDM entity by using an N interface 8 (N8 for short), the AMF entity communicates with the SMF entity by using an N interface 11 (N11 for short), the AMF entity communicates with the PCF entity by using an N interface 15 (N15 for short), the SMF entity communicates with the PCF entity by using an N interface 7 (N7 for short), and the SMF entity communicates with the UPF entity by using an N interface 4 (N4 for short).

The terminal in this embodiment of this application may include various handheld devices, vehicle-mounted devices, wearable devices, or computing devices that have a wireless communication function, or another processing device connected to a wireless modem. The terminal may also be referred to as user equipment (UE), a mobile station (MS), or a terminal device, or may further include a subscriber unit, a cellular phone, a smartphone, a wireless data card, a personal digital assistant (PDA) computer, a tablet computer, a wireless modem, a handheld (handheld) device, a laptop computer, a cordless phone, a wireless local loop (WLL) station, a machine type communication (MTC) terminal, or the like.

The AN device in this embodiment of this application is an apparatus that is deployed in a radio access network and that is configured to provide a wireless communication function to a terminal. The AN device may include base stations in various forms, such as a macro base station, a micro base station (also referred to as a small cell), a relay station, and an access point. In systems that use different radio access technologies, devices having a base station function may have different names. For example, in a long term evolution (LTE) system, the device is referred to as an evolved NodeB (eNB or eNodeB), and in a 3rd generation (3G) system, the device is referred to as a NodeB.

The AMF entity in this embodiment of this application is responsible for functions such as registration management, mobility management, and lawful interception.

For functions of the SMF entity and the PCF entity in this embodiment of this application, refer to the descriptions in FIG. 1. Details are not described herein again. In addition, the SMF entity is further configured to perform session management, including session establishment, session modification, session release, and session-related control functions such as assignment and management of an IP address of the terminal, selection and control of the UPF entity, and lawful interception. The PCF entity further provides a policy rule, and supports policy-related functions such as unified policy architecture management network behavior.

The UPF entity in this embodiment of this application may be responsible for processing functions such as forwarding and statistics collection of a packet of the terminal. For example, the UPF entity may implement user plane functions of a serving gateway (SGW) and a packet data network gateway (PGW). The UPF entity may alternatively be a software defined network (SDN) switch.

The UDM entity in this embodiment of this application is configured to store subscription data. In addition, the UDM entity further includes functions such as authentication, subscriber identifier processing, and subscription management.

Although not shown, the 5G network may further include an authentication server function (AUSF) entity, a data storage function (DSF) entity, and the like. This is not specifically limited in this embodiment of this application.

It should be noted that the terminal, the AN device, the AMF entity, the SMF entity, the UDM entity, the UPF entity, and the PCF entity in the 5G network are only names. The names do not constitute a limitation on devices themselves. In the 5G network and the another future network, network elements or entities corresponding to the terminal, the AN device, the AMF entity, the SMF entity, the UDM entity, the UPF entity, and the PCF entity may have other names. This is not specifically limited in this embodiment of this application. For example, the UDM entity may be replaced with a home subscriber server (HSS), a user subscription database (USD), or a database entity. Uniform descriptions are provided herein, and details are not described below again.

FIG. 3 is a schematic flowchart of a method for selecting an access network type according to an embodiment of this application. The method relates to interaction between a terminal, a PCF entity, and an SMF entity. The method includes the following steps.

S301. The PCF entity determines that a network status of a first network does not meet a preset condition. The first network is a network currently accessed by the terminal.

For example, that the network status of the first network does not meet the preset condition may include: A congestion status or a quota of the first network does not meet the preset condition.

S302. The PCF entity sends an access network type corresponding to a second network to the SMF entity. Correspondingly, the SMF entity receives the access network type corresponding to the second network from the PCF entity. The access network type corresponding to the second network is used to instruct the terminal to redirect a session of the terminal to the second network, and the second network is a network other than the first network.

S303. The SMF entity sends the access network type corresponding to the second network to the terminal. Correspondingly, the terminal receives the access network type corresponding to the second network from the SMF entity.

S304. The terminal redirects the session of the terminal to the second network based on the access network type corresponding to the second network.

In the method for selecting an access network type provided in this embodiment of this application, a network side may select the access network type based on the network status of the network, and redirect the session of the terminal from the first network to the second network when the network status of the first network does not meet the preset condition. In other words, control by the network side over selection of the access network type by the terminal is enhanced, and the access network type is more flexibly selected by the terminal. Therefore, a problem in the prior art that a selected access network type is inappropriate because network access is selected based on a current location of a terminal, and consequently, subsequent communication efficiency may be reduced can be avoided to some extent.

The following uses an example in which the system 10 for selecting an access network type shown in FIG. 1 is applied to the 5G network shown in FIG. 2, to describe, with reference to FIG. 4A to FIG. 7C, the method for selecting an access network type shown in FIG. 3.

Figure 4A:
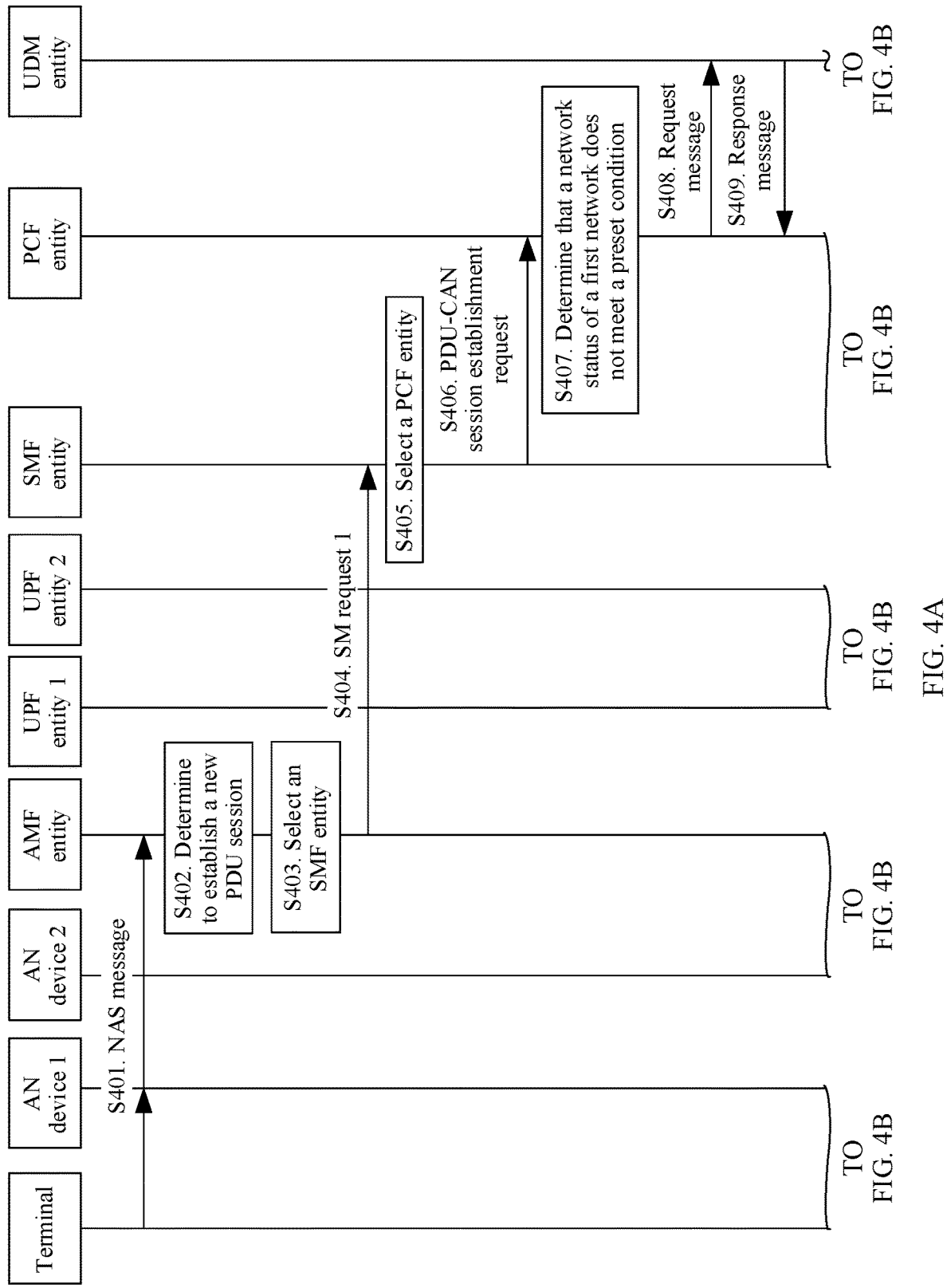
FIG. 4A and FIG. 4B are a second schematic flowchart of a method for selecting an access network type according to an embodiment of this application.
Figure 4B:
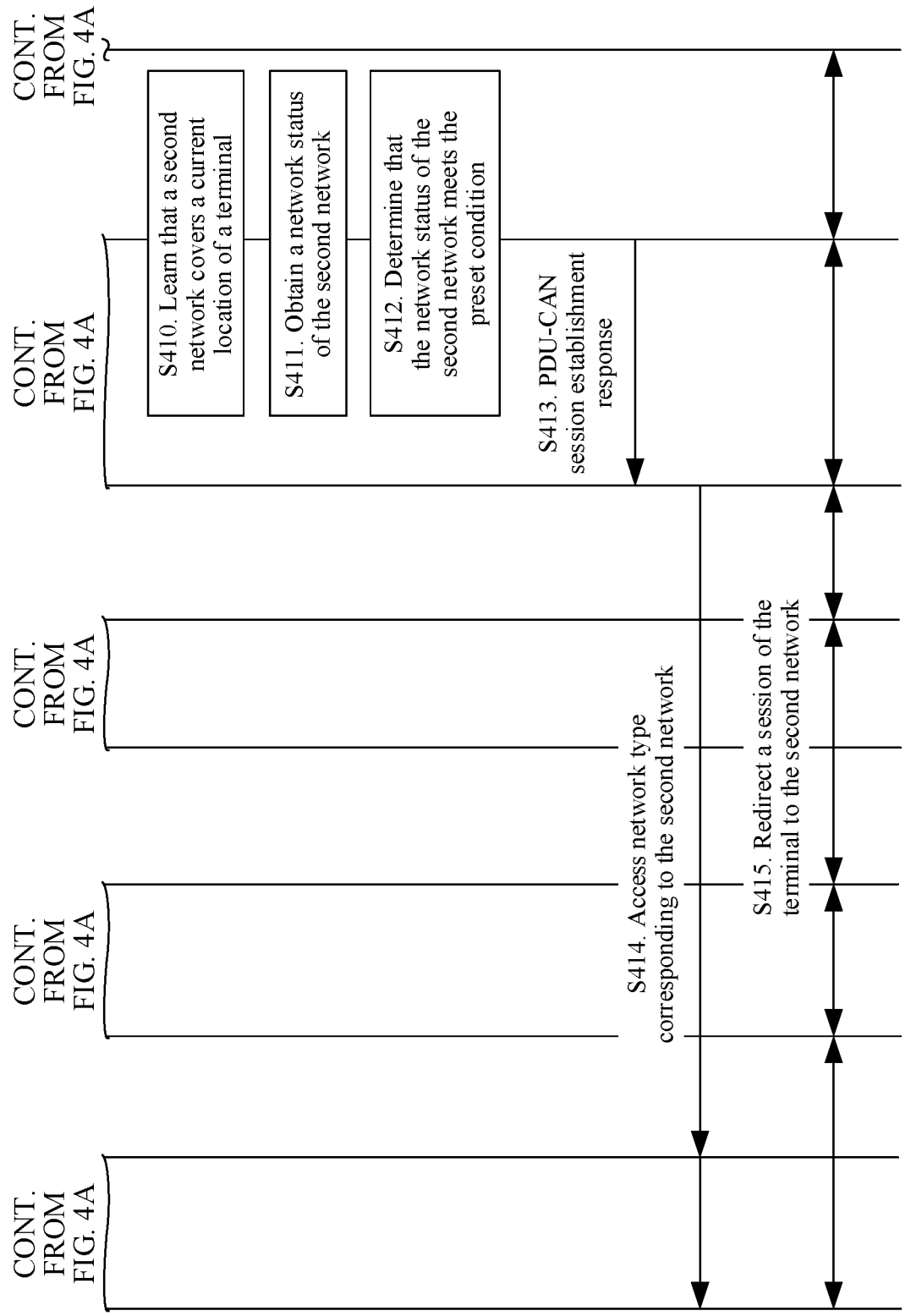

FIG. 4A and FIG. 4B show a method for selecting an access network type according to an embodiment of this application. The following describes the method by using an example in which the method for selecting an access network type is applied to a packet data unit (PDU) session establishment procedure. For example, the method relates to interaction between a terminal, a device 1, a device 2, an AMF entity, a UPF entity 1, a UPF entity 2, an SMF entity, a PCF entity, and a UDM entity. The method includes the following steps.

S401. The terminal sends a non-access stratum (NAS) message to the AMF entity. Correspondingly, the AMF entity receives the NAS message from the terminal. The NAS message includes a PDU session identifier (ID) and N1 session management (SM) information, and the N1 SM information includes a PDU session establishment request message.

In addition, the NAS message may further include other information, for example, single network slice selection assistance information (S-NSSAI) and a data network name (DNN). This is not specifically limited in this embodiment of this application.

S402. The AMF entity determines, based on the PDU session identifier, to establish a new PDU session.

S403. The AMF entity selects the SMF entity.

For a specific implementation in which the AMF entity selects the SMF entity, refer to the prior art. Details are not described herein.

S404. The AMF entity sends an SM request 1 to the SMF entity.

Correspondingly, the SMF entity receives the SM request 1 from the AMF entity. The SM request 1 includes the N1 SM information and a current access network type.

In addition, the SM request 1 may further include other information, such as a subscription parameter (subscriber parameter) identifier, a DNN, S-NSSAI, a PDU session identifier, an AMF identifier, and user location information. This is not specifically limited in this embodiment of this application.

S405. The SMF entity selects the PCF entity.

For a specific implementation in which the SMF entity selects the PCF entity, refer to the prior art. Details are not described herein.

S406. The SMF entity sends a PDU-connectivity access network (connectivity access network, CAN) session establishment request to the PCF entity. Correspondingly, the PCF entity receives the PDU-CAN session establishment request from the SMF entity. The PDU-CAN session establishment request includes user location information and the current access network type.

Optionally, in this embodiment of this application, the PCF entity may send a terminal location request to the SMF entity or the AMF entity. Correspondingly, after receiving the terminal location request from the PCF entity, the SMF entity sends the user location information to the PCF entity. A network element from which the PCF entity obtains the user location information is not limited in this embodiment of this application.

The user location information in this embodiment of this application may also be referred to as terminal location information. Uniform descriptions are provided herein, and details are not described below again.

S407. The PCF entity determines that the network status of the first network does not meet the preset condition, where the first network is a network currently accessed by the terminal, that is, a network corresponding to the current access network type.

Optionally, the network status in this embodiment of this application includes at least one of a congestion status or a quota. The congestion status includes being congested or not being congested. The quota refers to traffic that can be used by a user in a specified period or in a session.

If the network status includes a congestion status, that the network status of the first network does not meet the preset condition specifically means that the first network is congested.

If the network status includes a quota, that the network status of the first network does not meet the preset condition specifically means that traffic that can be used by the user in a specified period or in a session does not meet a user requirement.

Optionally, the PCF entity may query the network status of the first network in the PCF entity in real time after receiving the PDU-CAN session establishment request, or may periodically query the network status of the first network after receiving the PDU-CAN session establishment request. This is not specifically limited in this embodiment of this application.

S408. The PCF entity sends a request message to the UDM entity. Correspondingly, the UDM entity receives the request message from the PCF entity. The request message includes the user location information and is used to request access network type information for a current location of the terminal.

S409. The UDM entity sends a response message to the PCF entity. Correspondingly, the PCF entity receives the response message from the UDM entity. The response message includes the access network type information for the current location of the terminal.

S410. The PCF entity learns, based on the access network type information for the current location of the terminal, that a second network covers the current location of the terminal, where the second network is a network, other than the first network, in networks that cover the current location of the terminal.

For example, the first network may be a 3GPP network, and the second network may be a non-3GPP network.

Optionally, the access network type information that is of the current location of the terminal and that is included in the response message in step S409 may include an access network type corresponding to the first network and an access network type corresponding to the second network, or may include only an access network type corresponding to the second network. This is not specifically limited in this embodiment of this application, and only that the PCF entity learns, based on the access network type information for the current location of the terminal, that the second network covers the current location of the terminal needs to be limited. In other words, the PCF only needs to learn of access network type information of a network, other than the first network, that covers the current location of the terminal.

Steps S408 to S410 provide a specific implementation in which the PCF entity learns that the second network covers the current location of the terminal. Optionally, the PCF entity may further learn, in another manner, that the second network covers the current location of the terminal. For example, the PCF entity learns, by interacting with the terminal, that the second network covers the current location of the terminal. Specifically, the PCF entity sends a request message to the terminal. The request message is used to request the access network type information for the current location of the terminal. Then, the terminal sends a response message to the PCF entity. The response message includes the access network type information for the current location of the terminal. Then, the PCF entity learns, based on the access network type information for the current location of the terminal, that the second network covers the current location of the terminal. The case is not specifically limited in this embodiment of this application. In this case, the PDU-CAN session establishment request message in step S406 may not include the user location information.

S411. The PCF entity obtains a network status of the second network.

Optionally, in this embodiment of this application, the PCF may exist as a common network element in the first network and the second network. In this case, after learning that the second network covers the current location of the terminal, the PCF entity may query the network status of the second network in the PCF entity.

Certainly, alternatively, the PCF entity may not be a common network element in the first network and the second network. In this case, the PCF entity may obtain the network status of the second network in a manner of interacting with a common network element in the first network and the second network. This is not specifically limited in this embodiment of this application.

S412. The PCF entity determines that the network status of the second network meets the preset condition.

If the network status includes a congestion status, that the network status of the second network meets the preset condition specifically means that the second network is not congested.

If the network status includes a quota, that the network status of the second network meets the preset condition specifically means that traffic that can be used by the user in a specified period or in a session meets a user requirement.

S413. The PCF entity sends a PDU-CAN session establishment response to the SMF entity. Correspondingly, the SMF entity receives the PDU-CAN session establishment response from the PCF entity. The PDU-CAN session establishment response includes the access network type corresponding to the second network. The access network type corresponding to the second network is used to instruct the terminal to redirect a session of the terminal to the second network.

S414. The SMF entity sends the access network type corresponding to the second network to the terminal by using the AN device 1. Correspondingly, the terminal receives the access network type corresponding to the second network from the SMF entity.

It should be noted that this embodiment of this application is described by using an example in which the terminal accesses the first network by using the AN device 1, and accesses the second network by using the AN device 2. Uniform descriptions are provided herein, and details are not described below again.

S415. The terminal redirects the session of the terminal to the second network based on the access network type corresponding to the second network.

For a specific implementation in which the terminal redirects the session of the terminal to the second network, refer to an existing procedure in which the terminal establishes a session in the first network. Details are not described herein.

In the method for selecting an access network type provided in this embodiment of this application, a network side may select the access network type based on the network status of the network, and redirect the session of the terminal from the first network to the second network when the network status of the first network does not meet the preset condition. In other words, control by the network side over selection of the access network type by the terminal is enhanced, and the access network type is more flexibly selected by the terminal.

In addition, step S411 and step S412 are optional steps. In this embodiment of this application, step S413 may alternatively be directly performed after step S410. This is not specifically limited in this embodiment of this application. When step S413 is performed after step S411 and step S412, because the network status of the second network meets the preset condition, a problem in the prior art that a selected access network type is inappropriate because network access is selected based on a current location of a terminal can be avoided, so that subsequent communication efficiency can be improved.

Figure 5A:
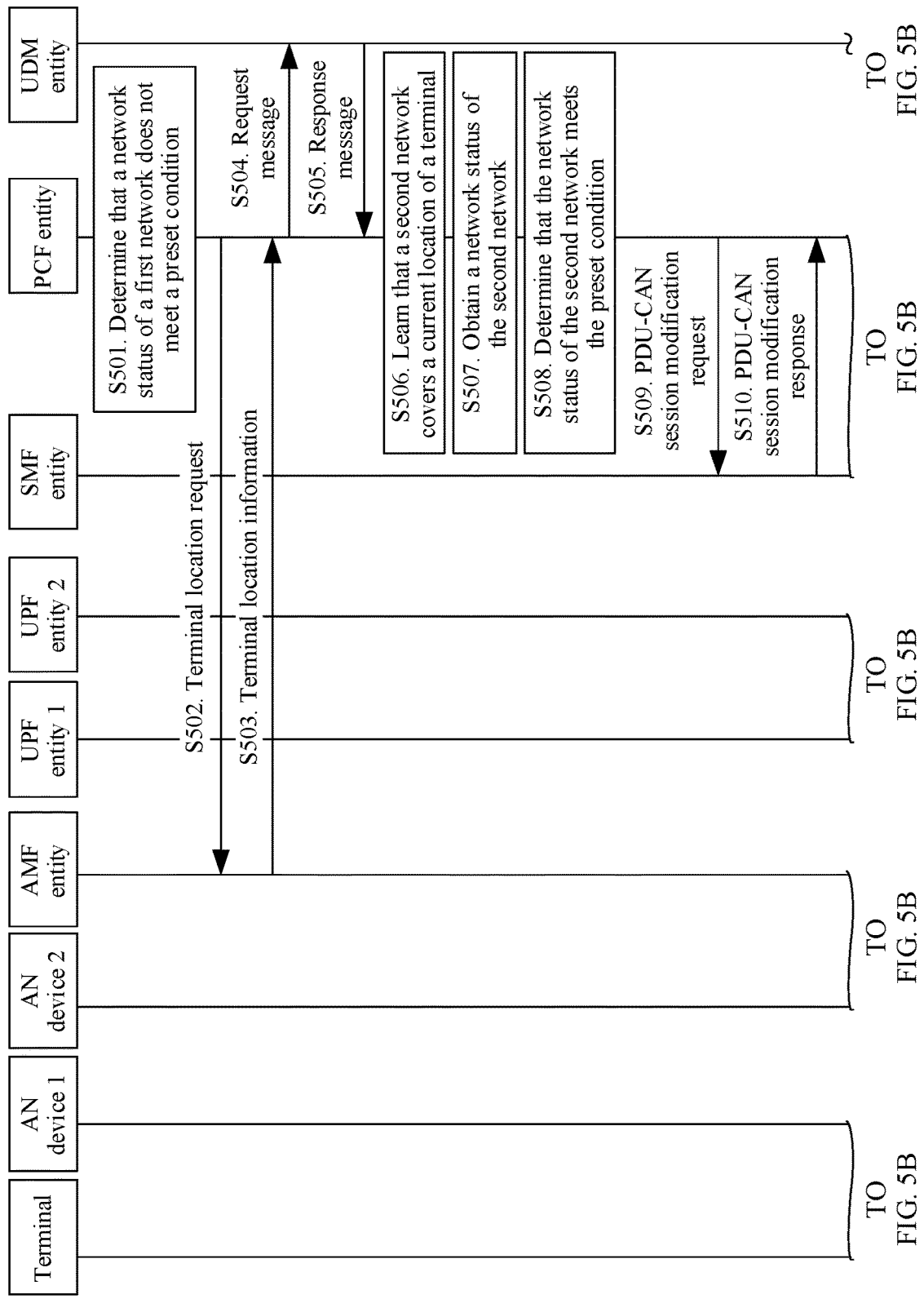
FIG. 5A, FIG. 5B, and FIG. 5C are a third schematic flowchart of a method for selecting an access network type according to an embodiment of this application.
Figure 5B:
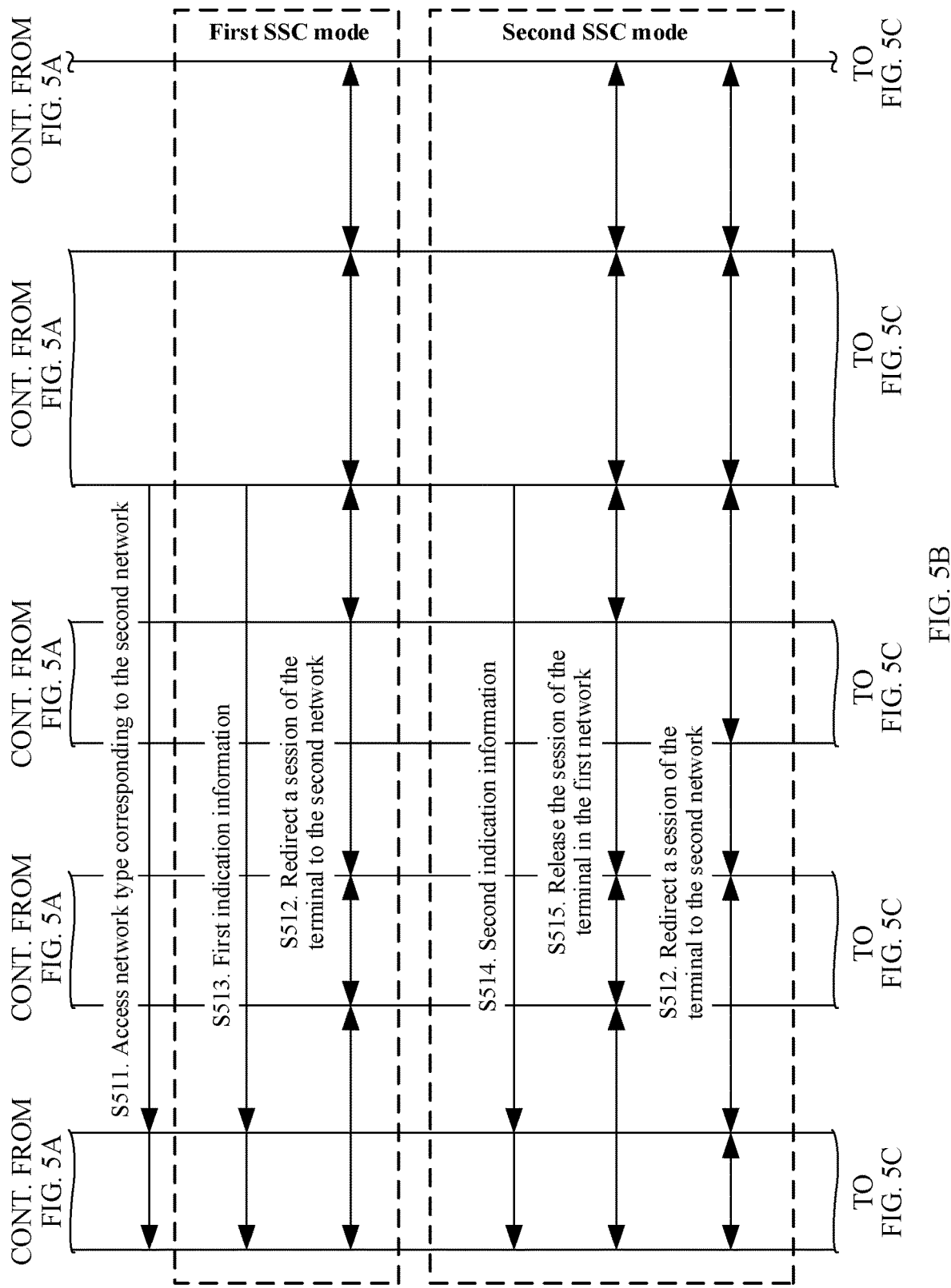
Figure 5C:
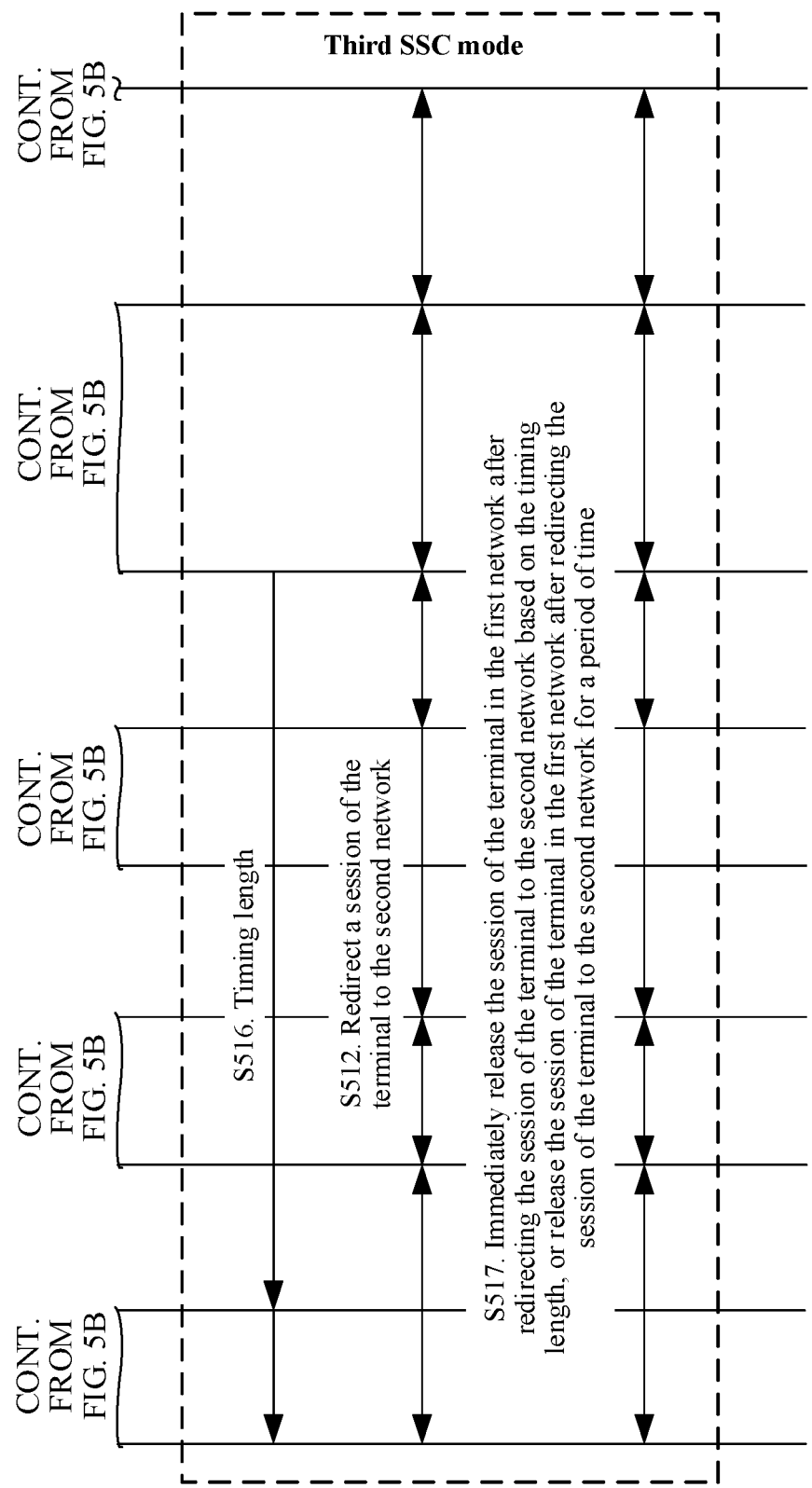

Optionally, FIG. 5A, FIG. 5B, and FIG. 5C show a method for selecting an access network type according to an embodiment of this application. The following describes the method by using an example in which the method for selecting an access network type is applied to a PDU session modification procedure. For example, the method relates to interaction between a terminal, an AN device 1, an AN device 2, an AMF entity, a UPF entity 1, a UPF entity 2, an SMF entity, a PCF entity, and a UDM entity. The method includes the following steps.

S501. The PCF entity determines that a network status of a first network does not meet a preset condition, where the first network is a network currently accessed by the terminal.

For a related implementation of step S501, refer to step S407 shown in FIG. 4A and FIG. 4B. Details are not described herein again.

S502. The PCF entity sends a terminal location request to the AMF entity. Correspondingly, the AMF entity receives the terminal location request from the PCF entity.

S503. The AMF entity sends terminal location information to the PCF entity. Correspondingly, the PCF entity receives the terminal location information from the AMF entity.

Optionally, the PCF entity may alternatively send a terminal location request to the SMF entity. Correspondingly, after receiving the terminal location request from the PCF entity, the SMF entity sends the terminal location information to the PCF entity. A network element from which the PCF entity obtains the terminal location information is not limited in this embodiment of this application.

S504 to S508 are the same as S408 to S412. For details, refer to the embodiment shown in FIG. 4A and FIG. 4B. Details are not described herein again.

S509. The PCF entity sends a PDU-CAN session modification request to the SMF entity. Correspondingly, the SMF entity receives the PDU-CAN session modification request from the PCF entity. The PDU-CAN session modification request includes an access network type corresponding to a second network. The access network type corresponding to the second network is used to instruct the terminal to redirect a session of the terminal to the second network.

S510. The SMF entity sends a PDU-CAN session modification response to the PCF entity. Correspondingly, the SMF entity receives the PDU-CAN session modification response from the PCF entity.

S511. The SMF entity sends the access network type corresponding to the second network to the terminal by using the AN device 1. Correspondingly, the terminal receives the access network type corresponding to the second network from the SMF entity.

S512. The terminal redirects the session of the terminal to the second network based on the access network type corresponding to the second network.

For a specific implementation in which the terminal redirects the session of the terminal to the second network, refer to an existing procedure in which the terminal establishes a session in the first network. Details are not described herein.

Optionally, a session and service continuity (SSC) mode includes a first SSC mode, a second SSC mode, and a third SSC mode. In the first SSC mode, after the terminal moves, an anchor of a PDU session remains unchanged. Therefore, continuity of the internet protocol (IP) can be maintained. In the second SSC mode, after the terminal moves, the SMF entity releases an old session, then selects an appropriate anchor for the current location of the terminal, and establishes a new session by using the new anchor. In the third SSC mode, after the terminal moves, the SMF entity selects an appropriate anchor for the current location of the terminal, and establishes a new session by using the new anchor. A service on an old session is migrated to the new session, or an old session is released after a period of time. The anchor in this embodiment of this application specifically refers to a UPF entity. Uniform descriptions are provided herein, and details are not described below again.

For different SSC modes, as shown in FIG. 5A, FIG. 5B, and FIG. 5C, this embodiment of this application further includes the following steps.

If a current SSC mode is the first SSC mode, the method further includes the following step S513.

S513. The SMF entity sends first indication information to the terminal. Correspondingly, the terminal receives the first indication information from the SMF entity. The first indication information is used to instruct the terminal to redirect the session to the second network after the session is deactivated.

In this way, the terminal performs step S512 after deactivating the session of the terminal in the first network.

If the current SSC mode is the second SSC mode, the method further includes the following steps S514 and S515.

S514. The SMF entity sends second indication information to the terminal. Correspondingly, the terminal receives the second indication information from the SMF entity. The second indication information is used to instruct the terminal to release the session of the terminal in the first network.

S515. The terminal releases the session of the terminal in the first network.

If the current SSC mode is the third SSC mode, the method further includes the following steps S516 and S517.

S516. The SMF entity sends a timing length to the terminal. Correspondingly, the terminal receives the timing length from the SMF entity. The timing length is used to indicate a time for which the session of the terminal in the first network is released.

In this way, after step S512, the terminal performs step S517.

S517. The terminal immediately releases the session of the terminal in the first network after redirecting the session of the terminal to the second network based on the timing length, or releases the session of the terminal in the first network after redirecting the session of the terminal to the second network for a period of time.

Optionally, the first indication information in step S513, the second indication information in step S514, or the timing length in step S516 and the access network type corresponding to the second network in step S511 may be carried in a message and sent to the terminal in one step, or may be carried in different messages and sent to the terminal in different steps. This is not specifically limited in this embodiment of this application.

It should be noted that the embodiment shown in FIG. 5A, FIG. 5B, and FIG. 5C is described by using an example in which the SMF entity performs a corresponding operation in an SSC mode of a current session. Optionally, in this embodiment of this application, the terminal may alternatively perform the foregoing operation in the SSC mode that is of the current session and that is received from the SMF entity. For example, if the current SSC mode is the first SSC mode, after receiving the SSC mode of the current session from the SMF entity, the terminal deactivates the session of the terminal in the first network and then performs step S512. If the current SSC mode is the second SSC mode, after receiving the SSC mode of the current session from the SMF entity, the terminal further performs step S515. If the current SSC mode is the third SSC mode, after receiving the SSC mode of the current session from the SMF entity, the terminal further performs step S517. This is not specifically limited in this embodiment of this application.

In the method for selecting an access network type provided in this embodiment of this application, a network side may select the access network type based on the network status of the network, and redirect the session of the terminal from the first network to the second network when the network status of the first network does not meet the preset condition. In other words, control by the network side over selection of the access network type by the terminal is enhanced, and the access network type is more flexibly selected by the terminal.

Figure 6A:
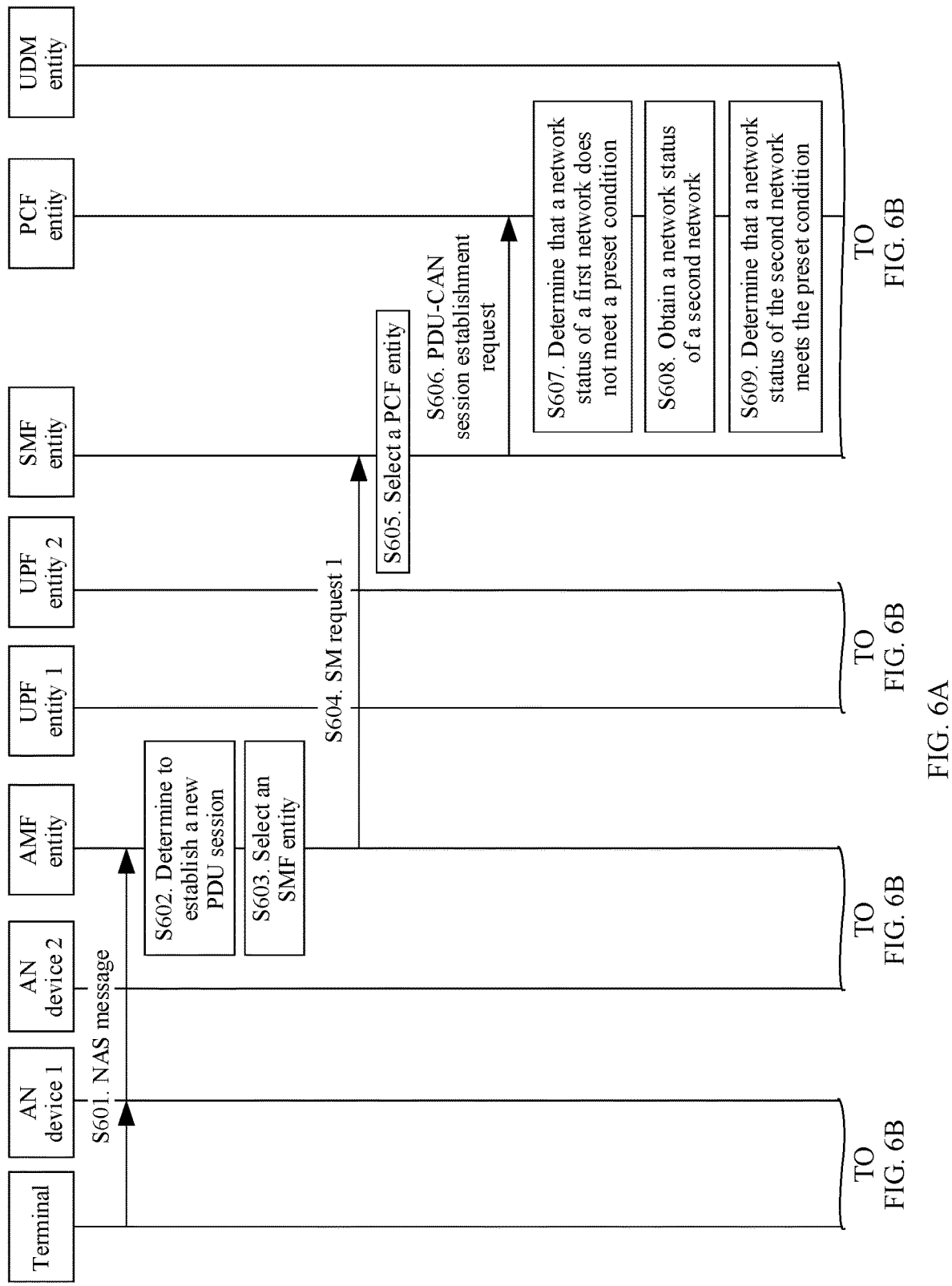
FIG. 6A and FIG. 6B are a fourth schematic flowchart of a method for selecting an access network type according to an embodiment of this application.
Figure 6B:
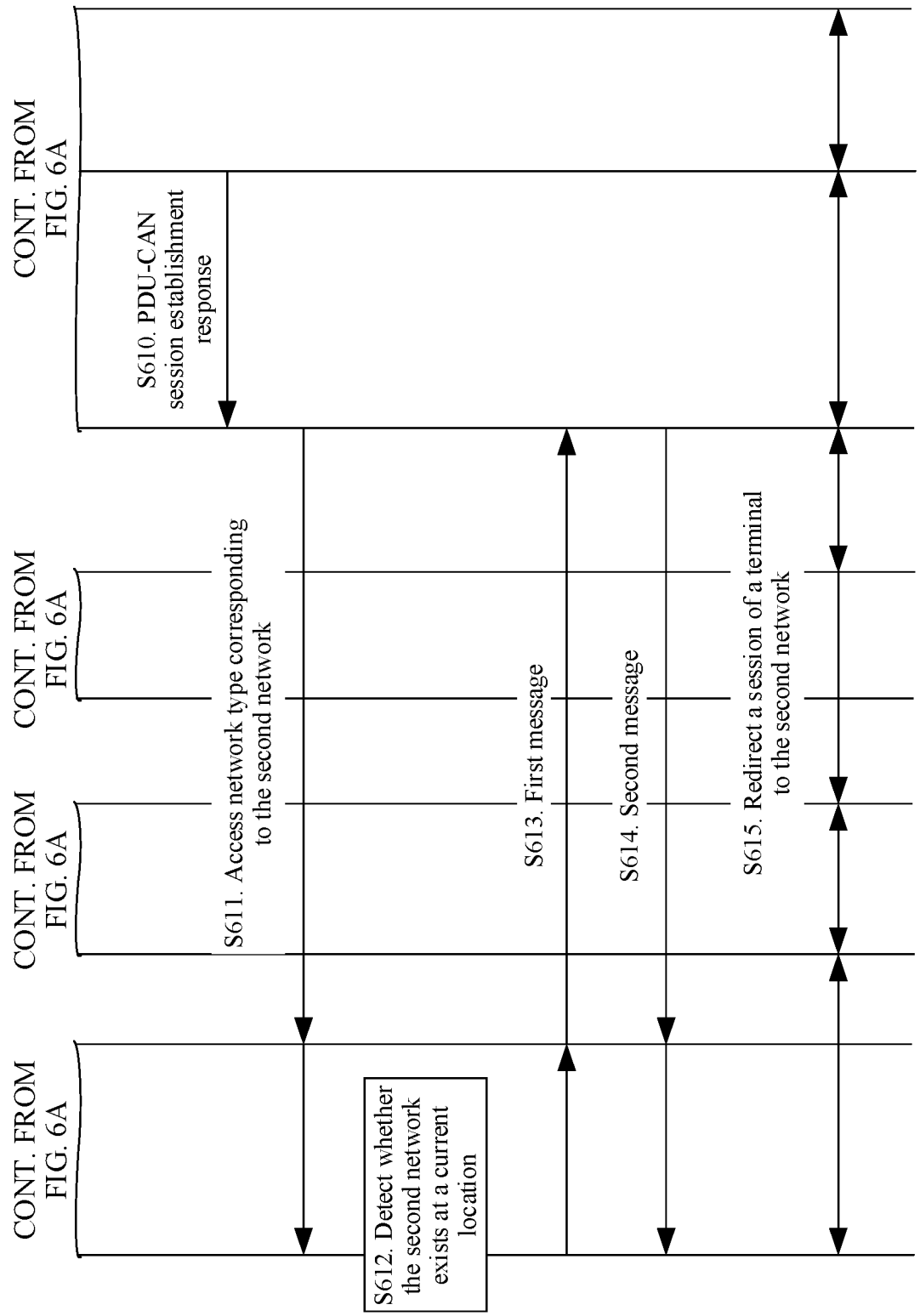

Optionally, FIG. 6A and FIG. 6B show a method for selecting an access network type according to an embodiment of this application. The following describes the method by using an example in which the method for selecting an access network type is applied to a PDU session establishment procedure. For example, the method relates to interaction between a terminal, an AN device 1, an AN device 2, an AMF entity, a UPF entity 1, a UPF entity 2, an SMF entity, a PCF entity, and a UDM entity. The method includes the following steps.

S601 to S605 are the same as S401 to S405. For details, refer to the embodiment shown in FIG. 4A and FIG. 4B. Details are not described herein again.

S606. The SMF entity sends a PDU-CAN session establishment request to the PCF entity. Correspondingly, the PCF entity receives the PDU-CAN session establishment request from the SMF entity. The PDU-CAN session establishment request includes the current access network type.

S607. The PCF entity determines that the network status of the first network does not meet the preset condition, where the first network is a network currently accessed by the terminal, that is, a network corresponding to the current access network type.

For a related implementation of step S607, refer to step S407 shown in FIG. 4A and FIG. 4B. Details are not described herein again.

S608. The PCF entity obtains a network status of a second network, where the second network is a network other than the first network.

For a related implementation of step S608, refer to step S411 shown in FIG. 4A and FIG. 4B. Details are not described herein again.

S609. The PCF entity determines that the network status of the second network meets the preset condition.

For a related implementation of step S609, refer to step S412 shown in FIG. 4A and FIG. 4B. Details are not described herein again.

S610. The PCF entity sends a PDU-CAN session establishment response to the SMF entity. Correspondingly, the SMF entity receives the PDU-CAN session establishment response from the PCF entity. The PDU-CAN session establishment response includes the access network type corresponding to the second network. The access network type corresponding to the second network is used to instruct the terminal to redirect a session of the terminal to the second network.

S611. The SMF entity sends the access network type corresponding to the second network to the terminal by using the AN device 1. Correspondingly, the terminal receives the access network type corresponding to the second network from the SMF entity.

S612. The terminal detects, based on the access network type corresponding to the second network, whether the second network exists at a current location.

S613. The terminal sends a first message to the SMF entity by using the AN device 1. Correspondingly, the SMF entity receives the first message from the terminal. The first message is used to indicate whether the terminal has detected the second network.

S614. If the SMF entity determines, based on the first message, that the terminal has detected the second network, the SMF entity sends a second message to the terminal. Correspondingly, the terminal receives the second message from the SMF entity. The second message is used to instruct the terminal to redirect the session of the terminal to the second network.

Optionally, if the SMF entity determines, based on the first message, that the terminal cannot detect the second network, the SMF entity continues to establish a session in the current first network. This is not specifically limited in this embodiment of this application.

Optionally, the SMF entity in steps S613 and S614 may alternatively be replaced with the PCF entity. To be specific, the terminal sends the first message to the PCF entity by using the AN device 1. If the PCF entity determines, based on the first message, that the terminal has detected the second network, the PCF entity sends the second message to the terminal. If the PCF entity determines, based on the first message, that the terminal cannot detect the second network, the PCF entity continues to establish a session in the current first network. This is not specifically limited in this embodiment of this application.

S615. The terminal redirects the session of the terminal to the second network based on the access network type corresponding to the second network.

For a specific implementation in which the terminal redirects the session of the terminal to the second network, refer to an existing procedure in which the terminal establishes a session in the first network. Details are not described herein.

Optionally, in this embodiment of this application, the terminal may directly redirect the session of the terminal to the second network based on the access network type corresponding to the second network after detecting that the second network exists at the current location. Certainly, if the terminal detects that the second network does not exist at the current location, the terminal needs to send indication information to the SMF entity or the PCF entity. The indication information is used to instruct to continue to establish a session in the current first network. This is not specifically limited in this embodiment of this application.

In the method for selecting an access network type provided in this embodiment of this application, a network side may select the access network type based on the network status of the network, and redirect the session of the terminal from the first network to the second network when the network status of the first network does not meet the preset condition. In other words, control by the network side over selection of the access network type by the terminal is enhanced, and the access network type is more flexibly selected by the terminal.

In addition, step S608 and step S609 are optional steps. In this embodiment of this application, step S610 may alternatively be directly performed after step S607. This is not specifically limited in this embodiment of this application. When step S610 is performed after step S608 and step S609, because the network status of the second network meets the preset condition, a problem in the prior art that a selected access network type is inappropriate because network access is selected based on a current location of a terminal can be avoided, so that subsequent communication efficiency can be improved.

Figure 7A:
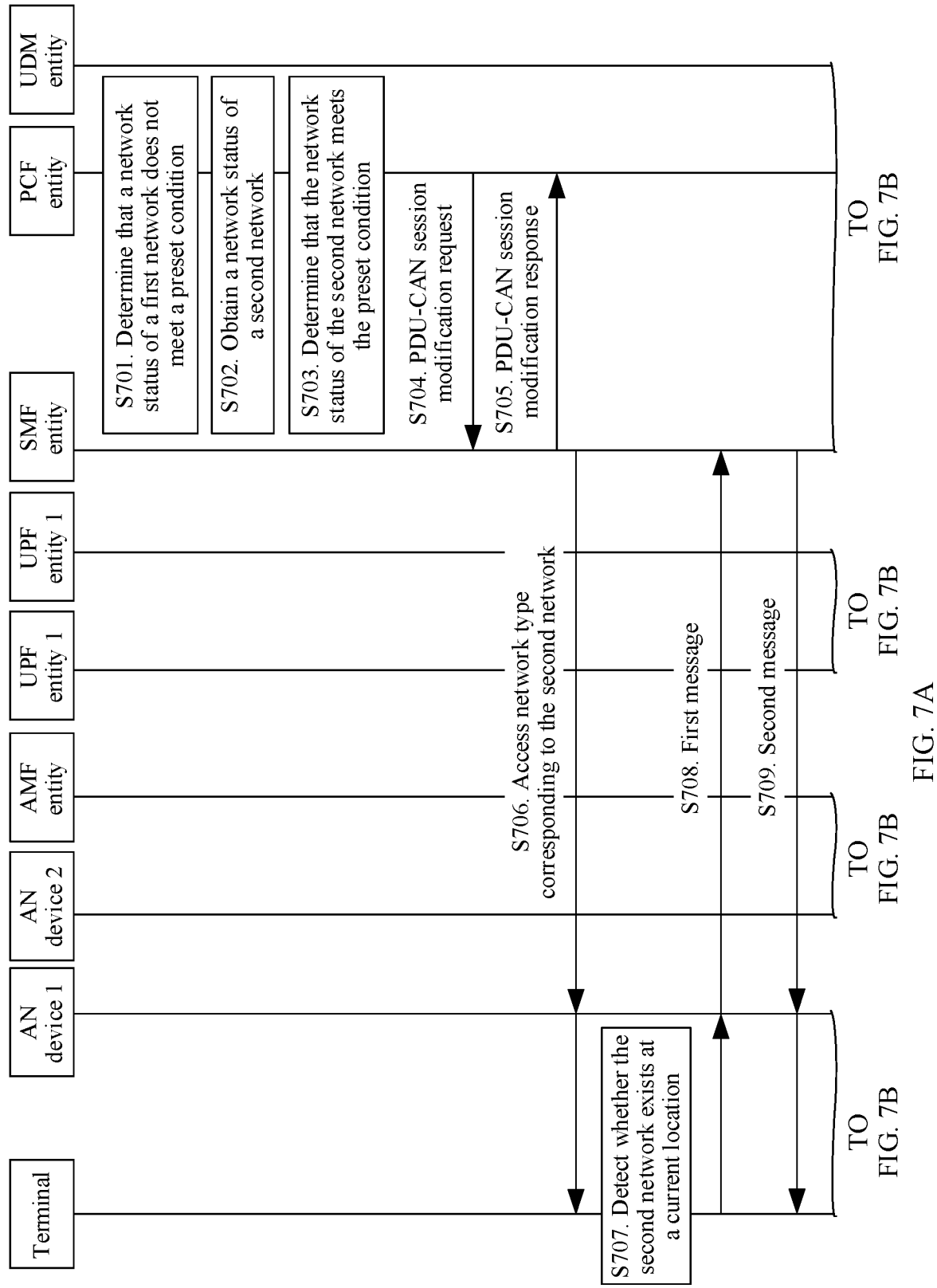
FIG. 7A, FIG. 7B, and FIG. 7C are a fifth schematic flowchart of a method for selecting an access network type according to an embodiment of this application.
Figure 7B:
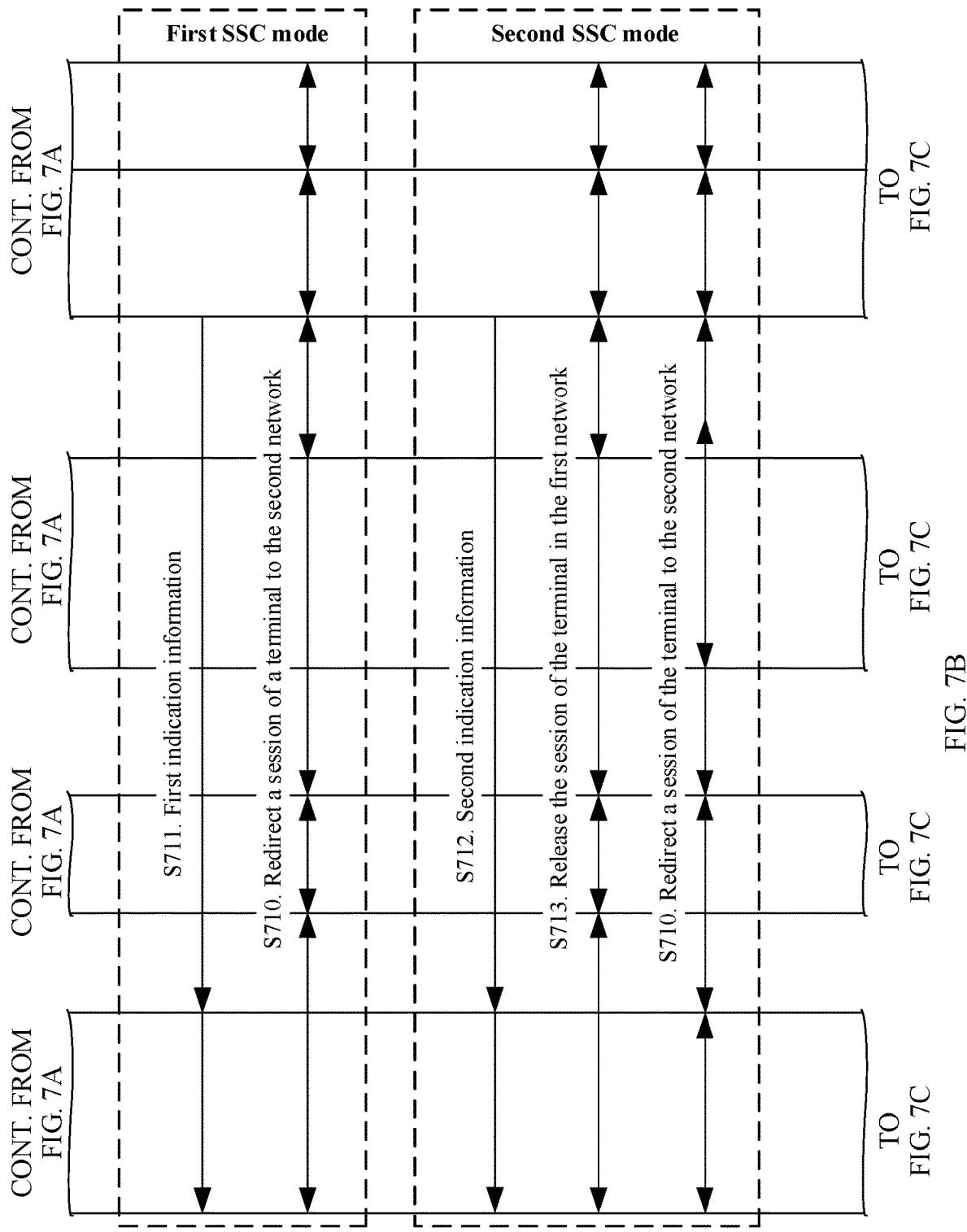
Figure 7C:
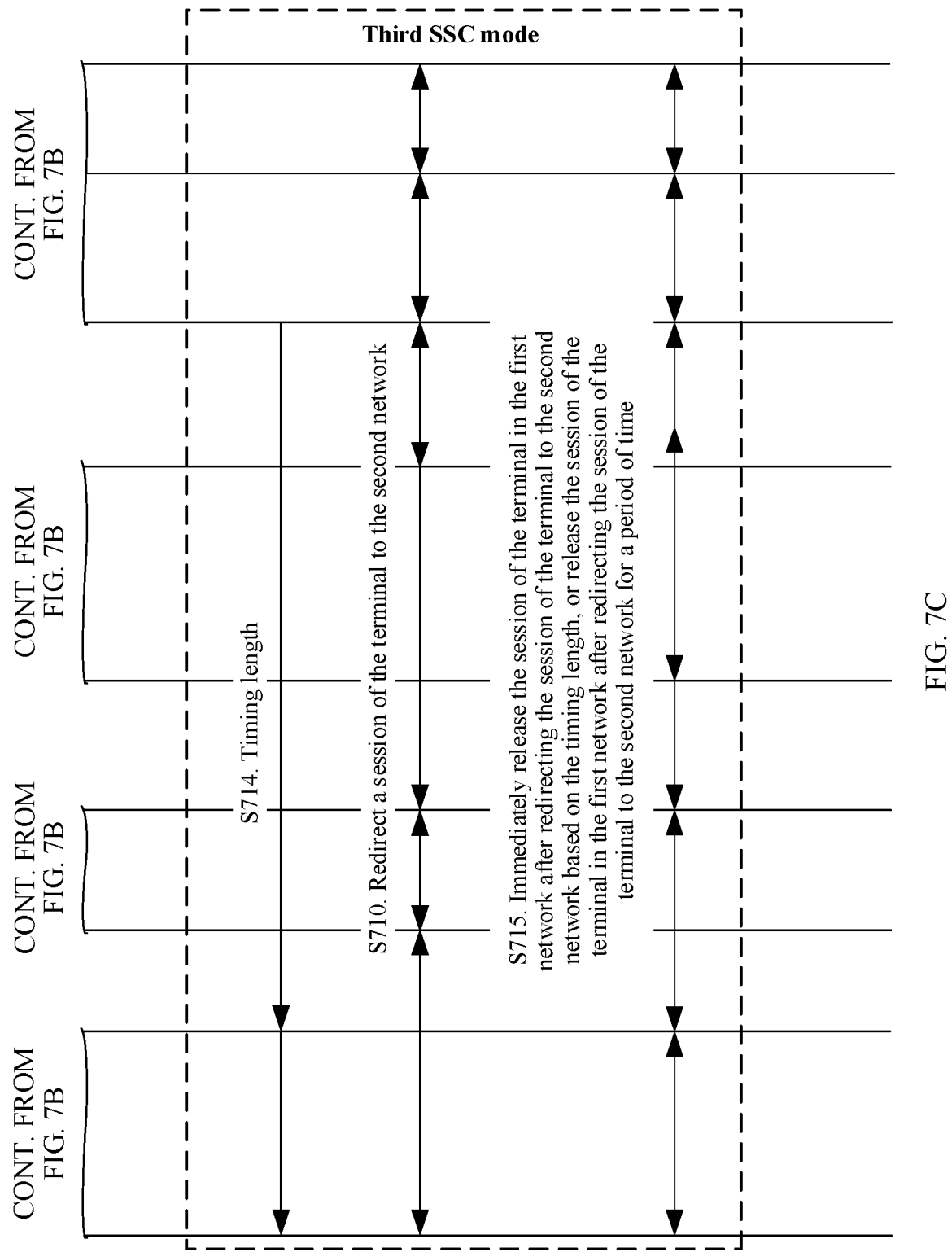

Optionally, FIG. 7A, FIG. 7B, and FIG. 7C show a method for selecting an access network type according to an embodiment of this application. The following describes the method by using an example in which the method for selecting an access network type is applied to PDU session establishment completion. For example, the method relates to interaction between a terminal, an AN device 1, an AN device 2, an AMF entity, a UPF entity 1, a UPF entity 2, an SMF entity, a PCF entity, and a UDM entity. The method includes the following steps.

S701. The PCF entity determines that a network status of a first network does not meet a preset condition, where the first network is a network currently accessed by the terminal.

For a related implementation of step S701, refer to step S407 shown in FIG. 4A and FIG. 4B. Details are not described herein again.

S702. The PCF entity obtains a network status of a second network, where the second network is a network other than the first network.

For a related implementation of step S702, refer to step S411 shown in FIG. 4A and FIG. 4B. Details are not described herein again.

S703. The PCF entity determines that the network status of the second network meets the preset condition.

For a related implementation of step S703, refer to step S412 shown in FIG. 4A and FIG. 4B. Details are not described herein again.

S704. The PCF entity sends a PDU-CAN session modification request to the SMF entity. Correspondingly, the SMF entity receives the PDU-CAN session modification request from the PCF entity. The PDU-CAN session modification request includes an access network type corresponding to a second network. The access network type corresponding to the second network is used to instruct the terminal to redirect a session of the terminal to the second network.

S705. The SMF entity sends a PDU-CAN session modification response to the PCF entity. Correspondingly, the SMF entity receives the PDU-CAN session modification response from the PCF entity.

S706. The SMF entity sends the access network type corresponding to the second network to the terminal by using the AN device 1. Correspondingly, the terminal receives the access network type corresponding to the second network from the SMF entity.

S707. The terminal detects, based on the access network type corresponding to the second network, whether the second network exists at a current location.

S708. The terminal sends a first message to the SMF entity by using the AN device 1. Correspondingly, the SMF entity receives the first message from the terminal. The first message is used to indicate whether the terminal has detected the second network.

S709. If the SMF entity determines, based on the first message, that the terminal has detected the second network, the SMF entity sends a second message to the terminal. Correspondingly, the terminal receives the second message from the SMF entity. The second message is used to instruct the terminal to redirect the session of the terminal to the second network.

Optionally, if the SMF entity determines, based on the first message, that the terminal cannot detect the second network, the SMF entity continues to establish a session in the current first network. This is not specifically limited in this embodiment of this application.

S710. The terminal redirects the session of the terminal to the second network based on the access network type corresponding to the second network.

For a specific implementation in which the terminal redirects the session of the terminal to the second network, refer to an existing procedure in which the terminal establishes a session in the first network. Details are not described herein.

Optionally, for different SSC modes, as shown in FIG. 7A, FIG. 7B, and FIG. 7C, this embodiment of this application further includes the following steps.

If a current SSC mode is the first SSC mode, the method further includes the following step S711.

S711. The SMF entity sends first indication information to the terminal. Correspondingly, the terminal receives the first indication information from the SMF entity. The first indication information is used to instruct the terminal to redirect the session to the second network after the session is deactivated.

In this way, the terminal performs step S710 after deactivating the session of the terminal in the first network.

If the current SSC mode is the second SSC mode, the method further includes the following steps S712 and S713.

S712. The SMF entity sends second indication information to the terminal. Correspondingly, the terminal receives the second indication information from the SMF entity. The second indication information is used to instruct the terminal to release the session of the terminal in the first network.

S713. The terminal releases the session of the terminal in the first network.

If the current SSC mode is the third SSC mode, the method further includes the following steps S714 and S715.

S714. The SMF entity sends a timing length to the terminal.

Correspondingly, the terminal receives the timing length from the SMF entity. The timing length is used to indicate a time for which the session of the terminal in the first network is released.

In this way, after step S710, the terminal performs step S715.

S715. The terminal immediately releases the session of the terminal in the first network after redirecting the session of the terminal to the second network based on the timing length, or releases the session of the terminal in the first network after redirecting the session of the terminal to the second network for a period of time.

Optionally, the first indication information in step S711, the second indication information in step S712, or the timing length in step S714 and the access network type corresponding to the second network in step S706 may be carried in a message and sent to the terminal in one step, or may be carried in different messages and sent to the terminal in different steps. This is not specifically limited in this embodiment of this application.

Optionally, the first indication information in step S711, the second indication information in step S712, or the timing length in step S714 may be carried in the second message in step S709 and sent to the terminal. This is not specifically limited in this embodiment of this application.

Optionally, the SMF entities in steps S708, S709, S711, S712, and S714 may alternatively be replaced with the PCF entities. This is not specifically limited in this embodiment of this application.

It should be noted that the embodiment shown in FIG. 7A, FIG. 7B, and FIG. 7C is described by using an example in which the SMF entity performs a corresponding operation in an SSC mode of a current session. Optionally, in this embodiment of this application, the terminal may alternatively perform the foregoing operation in the SSC mode that is of the current session and that is received from the SMF entity. For example, if the current SSC mode is the first SSC mode, after receiving the SSC mode of the current session from the SMF entity, the terminal deactivates the session of the terminal in the first network and then performs step S710. If the current SSC mode is the second SSC mode, after receiving the SSC mode of the current session from the SMF entity, the terminal further performs step S713. If the current SSC mode is the third SSC mode, after receiving the SSC mode of the current session from the SMF entity, the terminal further performs step S715. This is not specifically limited in this embodiment of this application.

In the method for selecting an access network type provided in this embodiment of this application, a network side may select the access network type based on the network status of the network, and redirect the session of the terminal from the first network to the second network when the network status of the first network does not meet the preset condition. In other words, control by the network side over selection of the access network type by the terminal is enhanced, and the access network type is more flexibly selected by the terminal.

In addition, step S702 and step S703 are optional steps. In this embodiment of this application, step S704 may alternatively be directly performed after step S701. This is not specifically limited in this embodiment of this application. When step S704 is performed after step S702 and step S703, because the network status of the second network meets the preset condition, a problem in the prior art that a selected access network type is inappropriate because network access is selected based on a current location of a terminal can be avoided, so that subsequent communication efficiency can be improved.

The foregoing mainly describes, from a perspective of interaction between network elements, the solutions provided in the embodiments of this application. It may be understood that to implement the foregoing functions, the PCF entity and the SMF entity include corresponding hardware structures and/or software modules for implementing the functions. A person skilled in the art should easily be aware that units and algorithm steps in the examples described with reference to the embodiments disclosed in this specification may be implemented in a form of hardware or in a form of a combination of hardware and computer software in this application. Whether a function is performed by hardware or hardware driven by computer software depends on particular applications and design constraints of the technical solutions. A person skilled in the art may use a different method for each particular application to implement the described functions, but it should not be considered that the implementation goes beyond the scope of this application.

In the embodiments of this application, functional module division may be performed for the PCF entity and the SMF entity based on the foregoing method examples. For example, functional modules may be divided based on functions, or two or more functions may be integrated into one processing module. The integrated module may be implemented in a form of hardware, or may be implemented in a form of a software functional module. It should be noted that, in the embodiments of this application, module division is an example, and is merely a logical function division. In actual implementation, another division manner may be used.

Figure 8:
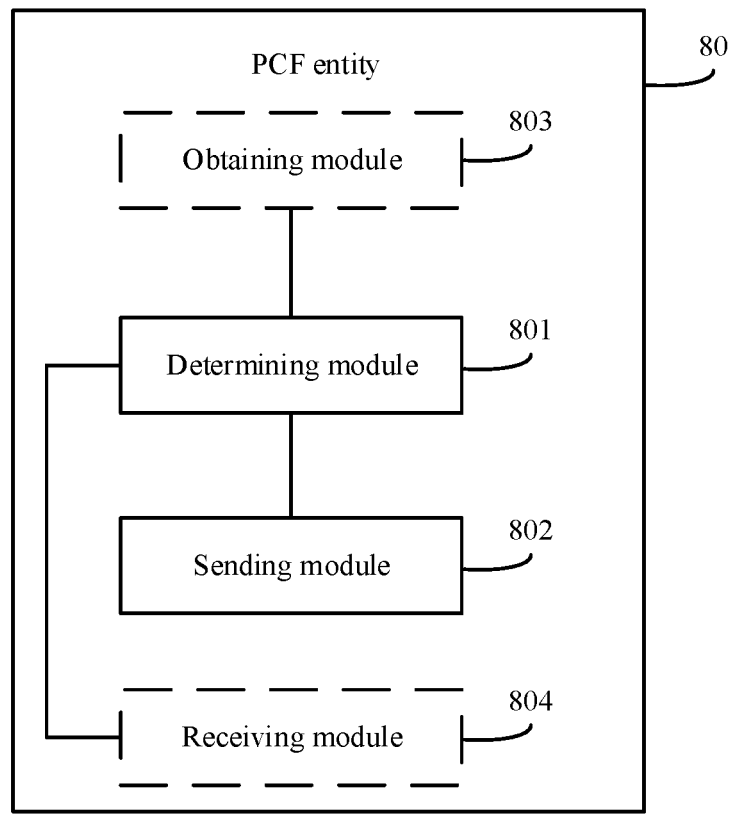
FIG. 8 is a first schematic structural diagram of a PCF entity according to an embodiment of this application.

For example, when the functional modules are divided based on the functions, FIG. 8 is a possible schematic structural diagram of a PCF entity 80 in the foregoing embodiments. The PCF entity 80 includes a determining module 801 and a sending module 802.

The determining module 801 is configured to determine that a network status of a first network does not meet a preset condition, where the first network is a network currently accessed by a terminal. The sending module 802 is configured to send an access network type corresponding to a second network to the terminal, where the access network type corresponding to the second network is used to instruct the terminal to redirect a session of the terminal to the second network, and the second network is a network other than the first network.

Optionally, the network status in this embodiment of this application includes at least one of a congestion status or a quota.

Optionally, as shown in FIG. 8, the PCF entity in this embodiment of this application further includes an obtaining module 803.

The obtaining module 803 is configured to obtain a network status of the second network before the sending module 802 sends the access network type corresponding to the second network to the terminal. The determining module 801 is further configured to determine that the network status of the second network meets the preset condition.

Optionally, the obtaining module 803 is configured to obtain location information of the terminal. The determining module 801 is further configured to learn, based on the location information of the terminal, that the second network covers a current location of the terminal.

Optionally, the determining module 801 is specifically configured to: send a request message to a UDM entity, where the request message includes the location information of the terminal and is used to request access network type information for the current location of the terminal; receive a response message from the UDM entity, where the response message includes the access network type information for the current location of the terminal; and learn, based on the access network type information for the current location of the terminal, that the second network covers the current location of the terminal.

Optionally, the obtaining module 803 is specifically configured to: receive the location information of the terminal from an SMF entity; or the obtaining module 803 is specifically configured to: receive the location information of the terminal from an AMF entity.

Optionally, as shown in FIG. 8, the PCF entity further includes a receiving module 804.

The sending module 802 is further configured to send a request message to the terminal, where the request message is used to request access network type information for a current location of the terminal. The receiving module 804 is configured to receive a response message from the terminal, where the response message includes the access network type information for the current location of the terminal. The determining module 801 is further configured to learn, based on the access network type information for the current location of the terminal, that the second network covers the current location of the terminal.

Optionally, the receiving module 804 is configured to: receive a first message from the terminal after the sending module 802 sends the access network type corresponding to the second network to the terminal, where the first message is used to indicate whether the terminal has detected the second network.

The sending module is configured to send a second message to the terminal if the determining module 801 determines, based on the first message, that the terminal has detected the second network, where the second message is used to instruct the terminal to redirect the session of the terminal to the second network.

Figure 9:
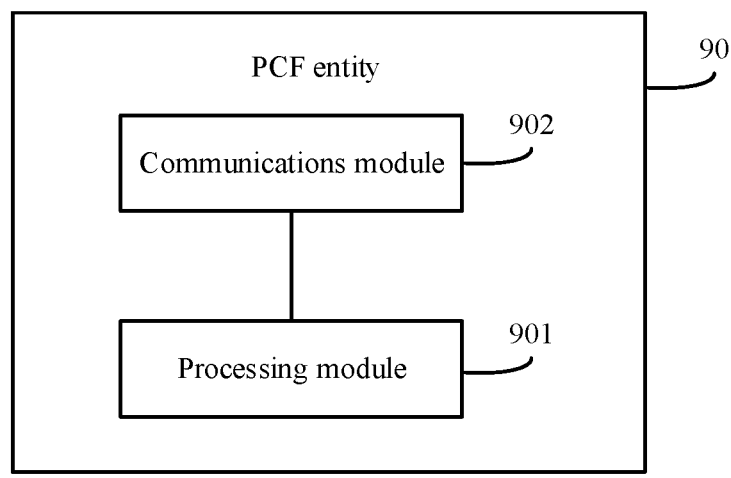
FIG. 9 is a second schematic structural diagram of a PCF entity according to an embodiment of this application.

When the function modules are divided through integration, FIG. 9 is a possible schematic structural diagram of a PCF entity 90 in the foregoing embodiments. As shown in FIG. 9, the PCF entity 90 includes a processing module 901 and a communications module 902. The processing module 901 performs an action of the determining module 801 in FIG. 8, and the communications module 902 performs an action of the sending module 802 in FIG. 8. Optionally, the processing module 901 performs an action of the obtaining module 803 in FIG. 8, and the communications module 902 performs an action of the receiving module 804 in FIG. 8. For details, refer to the embodiment shown in FIG. 8. Details are not described herein again.

Figure 10:
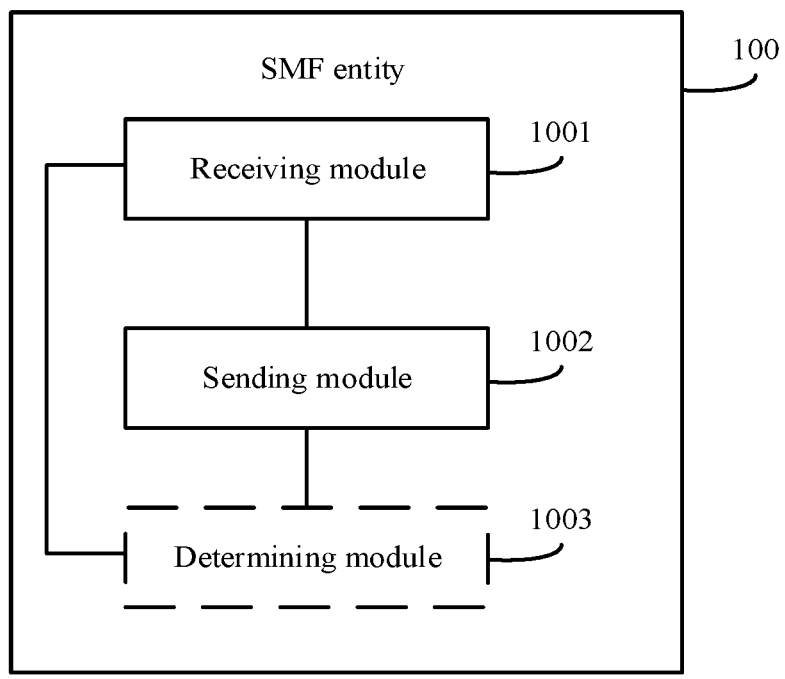
FIG. 10 is a first schematic structural diagram of an SMF entity according to an embodiment of this application.

Alternatively, for example, when the functional modules are divided based on the functions, FIG. 10 is a possible schematic structural diagram of an SMF entity 100 in the foregoing embodiments. The SMF entity 100 includes a receiving module 1001 and a sending module 1002.

The receiving module 1001 is configured to receive an access network type corresponding to a second network from a PCF entity. The sending module 1002 is configured to send an access network type corresponding to a second network to the terminal, where the access network type corresponding to the second network is used to instruct the terminal to redirect a session of the terminal to the second network.

Optionally, the second network is a network, other than a first network, in networks that cover a current location of the terminal, and the first network is a network currently accessed by the terminal.

Optionally, the second network is a network other than a first network, and the first network is a network currently accessed by the terminal.

Optionally, as shown in FIG. 10, the SMF entity 100 further includes a determining module 1003. The receiving module 1001 is configured to: receive a first message from the terminal after the sending module 1002 sends the access network type corresponding to the second network to the terminal, where the first message is used to indicate whether the terminal has detected the second network. The sending module 1002 is further configured to send a second message to the terminal if the determining module 1003 determines, based on the first message, that the terminal has detected the second network, where the second message is used to instruct the terminal to redirect the session of the terminal to the second network.

Optionally, the sending module 1002 is further configured to send first indication information to the terminal if a current SSC mode is a first SSC mode, where the first indication information is used to instruct the terminal to redirect the session to the second network after the session is deactivated.

Alternatively, the sending module 1002 is further configured to send second indication information to the terminal if a current SSC mode is a second SSC mode, where the second indication information is used to instruct to release the session.

Alternatively, the sending module 1002 is further configured to send a timing length to the terminal if a current SSC mode is a third SSC mode, where the timing length is used to indicate a time for which the session is released.

Figure 11:
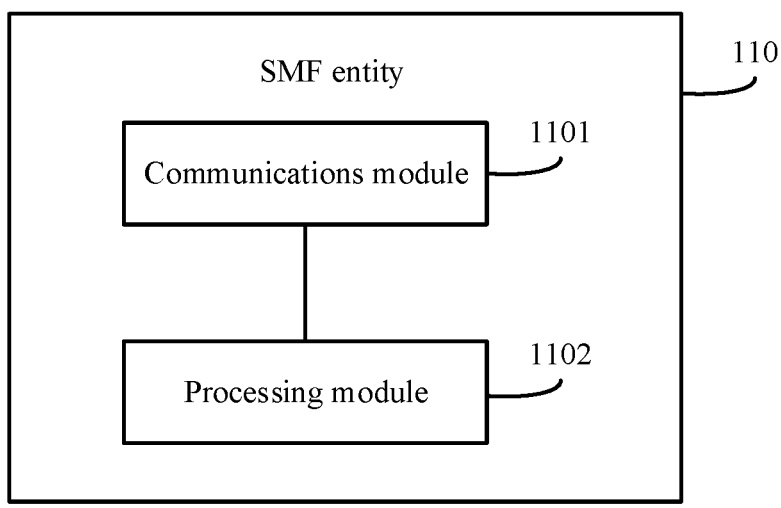
FIG. 11 is a second schematic structural diagram of an SMF entity according to an embodiment of this application.

When the function modules are divided through integration, FIG. 11 is a possible schematic structural diagram of an SMF entity 110 in the foregoing embodiments. As shown in FIG. 11, the SMF entity 110 includes a communications module 1101. The communications module 1101 performs actions of the receiving module 1001 and the sending module 1002 in FIG. 10. Optionally, as shown in FIG. 11, the SMF entity 110 further includes a processing module 1102. The processing module 1102 performs an action of the determining module 1003 in FIG. 10. For details, refer to the embodiment shown in FIG. 10. Details are not described herein again.

In this embodiment, the PCF entity and the SMF entity are presented in a form in which the functional modules are divided based on the functions, or the PCF entity and the SMF entity are presented in a form in which the functional modules are divided through integration. The "module" herein may be an application-specific integrated circuit (ASIC), a circuit, a processor and a memory that execute one or more software or firmware programs, an integrated logic circuit, and/or another device that can provide the foregoing functions. In a simple embodiment, a person skilled in the art may figure out that the PCF entity and the SMF entity may be implemented by using the communications device in FIG. 12.

Figure 12:
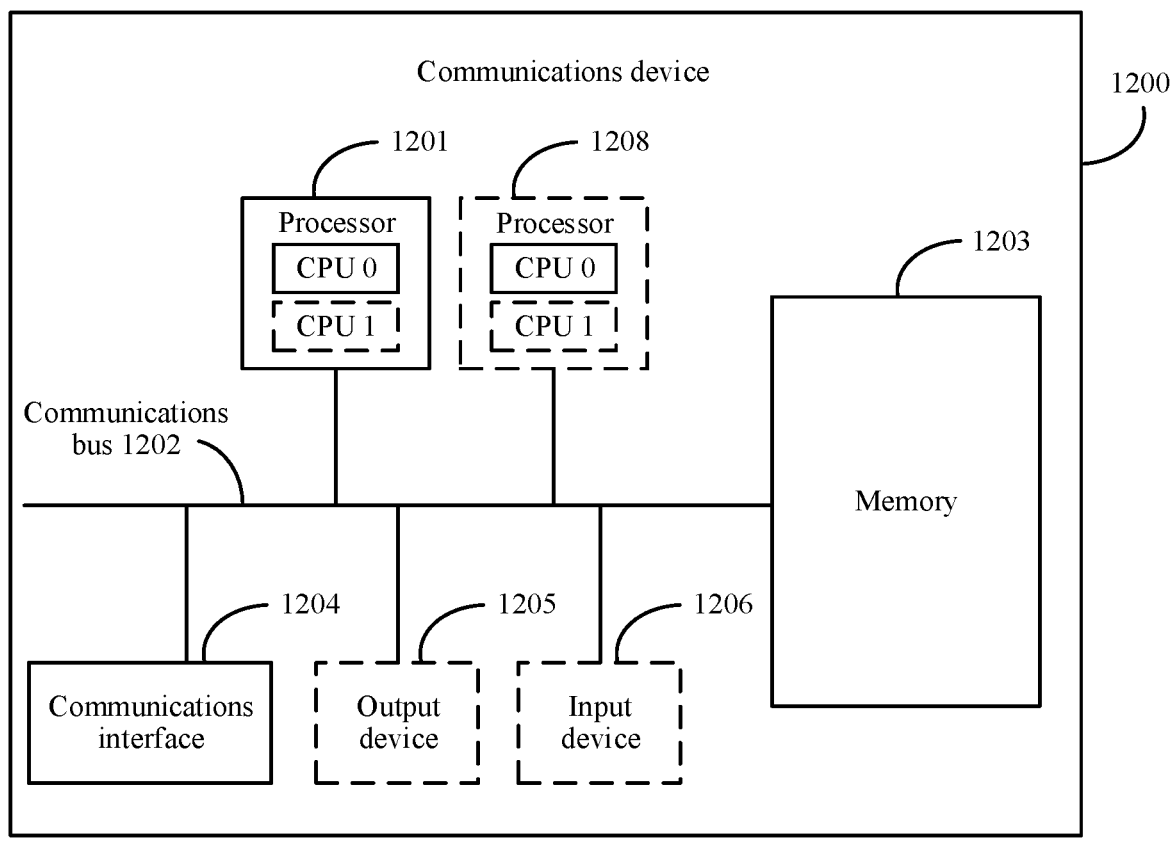
FIG. 12 is a schematic diagram of a hardware structure of a communications device according to an embodiment of this application.

FIG. 12 is a schematic diagram of a hardware structure of a communications device 1200 according to an embodiment of this application. The communications device 1200 includes a processor 1201, a communications bus 1202, and a communications interface 1204.

The processor 1201 may be a general purpose processor, for example, a central processing unit (CPU), a network processor (NP), or a combination of a CPU and an NP. Alternatively, the processor 1201 may be a microprocessor (MCU), an ASIC, a programmable logic device (PLD), or a combination thereof. The PLD may be a complex programmable logic device (CPLD), a field-programmable gate array (FPGA), a generic array logic (GAL), or any combination thereof.

The communications bus 1202 may include a channel on which information is transmitted between the foregoing components.

The communications interface 12012 may be any apparatus such as a transceiver, and is configured to communicate with another device or a communications network. The communications interface 12012 may include an Ethernet interface, a radio access network (RAN) interface, a wireless local area network (WLAN) interface, and the like.

Optionally, the communications device 1200 may further include a memory 1203. The memory 1203 may include a volatile memory, for example, a random access memory (RAM); or the memory may include a nonvolatile memory, for example, a flash memory, a hard disk drive (HDD), or a solid-state drive (SSD); or the memory 1203 may include a combination of the foregoing types of memories.

Optionally, the memory 1203 is configured to store program code. The processor 1201 is configured to execute program code stored in the memory 1203, to implement the method for selecting an access network type provided in this embodiment of this application.

During specific implementation, the processor 1201 may include one or more CPUs, for example, a CPU 0 and a CPU 1 in FIG. 12. The CPU may be a single-core CPU, or may be a multi-core CPU.

During specific implementation, in an embodiment, the communications device 1200 may further include an output device 1205 and an input device 1206. The output device 1205 communicates with the processor 1201, and may display information in a plurality of manners. For example, the output device 1205 may be a liquid crystal display (LCD), a light emitting diode (LED) display device, a cathode ray tube (CRT) display device, or a projector. The input device 1206 communicates with the processor 1201, and may accept input of a user in a plurality of manners. For example, the input device 1206 may be a mouse, a keyboard, a touchscreen device, or a sensing device.

The communications device 1200 may be a general-purpose node or a dedicated node. During specific implementation, the communications device 1200 may be a desktop computer, a portable computer, a network server, a palmtop computer (PDA), a mobile phone, a tablet computer, a wireless terminal device, an embedded device, or a device with a structure similar to that in FIG. 12. A type of the communications device 1200 is not limited in this embodiment of this application.

For example, the determining module 801, the sending module 802, the obtaining module 803, and the receiving module 804 in FIG. 8 may be implemented by using the processor 1201 and the memory 1203 in FIG. 12. Specifically, the determining module 801, the sending module 802, the obtaining module 803, and the receiving module 804 may be executed by the processor 1201 by invoking the application program code stored in the memory 1203. This is not limited in this embodiment of this application. Alternatively, for example, the processing module 901 and the communications module 902 in FIG. 9 may be implemented by the processor 1201 and the memory 1203 in FIG. 12. Specifically, the processing module 901 and the communications module 902 may be executed by the processor 1201 by invoking the application program code stored in the memory 1203. This is not limited in this embodiment of this application.

For example, the receiving module 1001, the sending module 1002, and the determining module 1003 in FIG. 10 may be implemented by using the processor 1201 and the memory 1203 in FIG. 12. Specifically, the receiving module 1001, the sending module 1002, and the determining module 1003 may be executed by the processor 1201 by invoking the application program code stored in the memory 1203. This is not limited in this embodiment of this application. Alternatively, for example, the processing module 1102 and the communications module 1101 in FIG. 11 may be implemented by the processor 1201 and the memory 1203 in FIG. 12. Specifically, the processing module 1102 and the communications module 1101 may be executed by the processor 1201 by invoking the application program code stored in the memory 1203. This is not limited in this embodiment of this application.

The PCF entity and the SMF entity provided in the embodiments of this application may be configured to perform the foregoing method for selecting an access network type. Therefore, for technical effects that can be achieved by the PCF entity and the SMF entity, refer to the foregoing method embodiments. Details are not described herein again in this embodiment of this application.

All or some of the foregoing embodiments may be implemented by means of software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a SSD), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of "a plurality of". A single processor or another unit may implement several functions listed in the claims. Some measures are set forth in dependent claims that are different from each other, but this does not mean that these measures cannot be combined to produce a good effect.

Although this application is described with reference to specific features and the embodiments thereof, apparently, various modifications and combinations may be made to this application without departing from the spirit and scope of this application. Correspondingly, the specification and accompanying drawings are merely example descriptions of this application defined by the appended claims, and are considered as any or all of modifications, variations, combinations, or equivalents that cover the scope of this application. Obviously, a person skilled in the art can make various modifications and variations to this application without departing from the spirit and scope of this application. In this way, this application is intended to cover these modifications and variations of this application provided that they fall within the scope of the claims of this application and equivalent technologies thereof.

What is claimed is:

1. A method for selecting an access network type, wherein the method comprises:
   determining, by a policy control function entity, that a quota of a first network does not meet a preset condition, wherein the first network is a network currently accessed by a terminal, wherein the quota of the first network indicates traffic available to a user in a specified period in the first network, and wherein determining that the quota of the first network does not meet the preset condition comprises determining that the traffic available to the user in the specified period in the first network does not meet a user requirement; and
   sending, by the policy control function entity, an access network type corresponding to a second network to the terminal, wherein the access network type corresponding to the second network is for redirecting a session of the terminal to the second network, and the second network is a network other than the first network.

2. The method according to claim 1, wherein the method further comprises:
   obtaining, by the policy control function entity, a quota of the second network, and determining that the quota of the second network meets the preset condition.

3. The method according to claim 1, wherein the method further comprises:
   obtaining, by the policy control function entity, location information of the terminal; and
   learning, by the policy control function entity based on the location information of the terminal, that the second network covers a current location of the terminal.

4. The method according to claim 3, wherein the learning, by the policy control function entity based on the location information of the terminal, that the second network covers a current location of the terminal comprises:
   sending, by the policy control function entity, a request message to a unified data management entity, wherein the request message comprises the location information of the terminal;
   receiving, by the policy control function entity, a response message from the unified data management entity, wherein the response message comprises access network type information for the current location of the terminal; and
   learning, by the policy control function entity based on the access network type information for the current location of the terminal, that the second network covers the current location of the terminal.

5. The method according to claim 3, wherein the obtaining, by the policy control function entity, location information of the terminal comprises:
   receiving, by the policy control function entity, the location information of the terminal from a session management function entity.

6. The method according to claim 3, wherein the obtaining, by the policy control function entity, location information of the terminal comprises:
   receiving, by the policy control function entity, the location information of the terminal from an access and mobility management function entity.

7. The method according to claim 1, wherein the method further comprises:
   sending, by the policy control function entity, a request message to the terminal, wherein the request message requests access network type information for a current location of the terminal;
   receiving, by the policy control function entity, a response message from the terminal, wherein the response message comprises the access network type information for the current location of the terminal; and
   learning, by the policy control function entity based on the access network type information for the current location of the terminal, that the second network covers the current location of the terminal.

8. The method according to claim 1, wherein the method further comprises:
   receiving, by the policy control function entity, a first message from the terminal, wherein the first message indicates whether the terminal has detected the second network; and
   in response to the policy control function entity determining, based on the first message, that the terminal has detected the second network, sending, by the policy control function entity, a second message to the terminal, wherein the second message instructs the terminal to redirect the session of the terminal to the second network.

9. A policy control function entity, comprising:
   a transceiver;
   at least one processor; and
   one or more memories coupled to the at least one processor and storing programming instructions for execution by the at least one processor to:
      determine that a quota of a first network does not meet a preset condition, wherein the first network is a network currently accessed by a terminal, wherein the quota of the first network indicates traffic available to a user in a specified period in the first network, and wherein determine that the quota of the first network does not meet the preset condition comprises determine that the traffic available to the user in the specified period in the first network does not meet a user requirement; and cause the transceiver to send an access network type corresponding to a second network to the terminal, wherein the access network type corresponding to the second network is for redirecting a session of the terminal to the second network, and the second network is a network other than the first network.

10. The policy control function entity according to claim 9, wherein the one or more memories store programming instructions for execution by the at least one processor to:
obtain a quota of the second network; and
determine that the quota of the second network meets the preset condition.

11. The policy control function entity according to claim 9, wherein the one or more memories store programming instructions for execution by the at least one processor to:
obtain location information of the terminal; and
learn, based on the location information of the terminal, that the second network covers a current location of the terminal.

12. The policy control function entity according to claim 11, wherein the one or more memories store programming instructions for execution by the at least one processor to cause the transceiver to:
send a request message to a unified data management entity, wherein the request message comprises the location information of the terminal;
receive a response message from the unified data management entity, wherein the response message comprises access network type information for the current location of the terminal; and
wherein the processor is configured to learn, based on the access network type information for the current location of the terminal, that the second network covers the current location of the terminal.

13. The policy control function entity according to claim 11, wherein the one or more memories store programming instructions for execution by the at least one processor to cause the transceiver to:
receive the location information of the terminal from a session management function entity; or
receive the location information of the terminal from an access and mobility management function entity.

14. The policy control function entity according to claim 9, wherein the one or more memories store programming instructions for execution by the at least one processor to cause the transceiver to send a request message to the terminal, wherein the request message requests access network type information for a current location of the terminal; and receive a response message from the terminal, wherein the response message comprises the access network type information for the current location of the terminal; and
wherein the one or more memories store programming instructions for execution by the at least one processor to learn, based on the access network type information for the current location of the terminal, that the second network covers the current location of the terminal.

15. The policy control function entity according to claim 9, wherein the one or more memories store programming instructions for execution by the at least one processor to cause the transceiver to:

receive a first message from the terminal after the transceiver sending the access network type corresponding to the second network to the terminal, wherein the first message indicates whether the terminal has detected the second network; and send a second message to the terminal in response to a determination based on the first message, that the terminal has detected the second network, wherein the second message instructs the terminal to redirect the session of the terminal to the second network.

16. A communications method, comprising:
determining, by a policy control function entity, that a quota of a first network does not meet a preset condition, wherein the first network is a network currently accessed by a terminal, wherein the quota of the first network indicates traffic available to a user in a specified period in the first network, and wherein determining that the quota of the first network does not meet the preset condition comprises determining that the traffic available to the user in the specified period in the first network does not meet a user requirement;

sending, by the policy control function entity, an access network type corresponding to a second network;

receiving, by a session management function entity the access network type corresponding to the second network from the policy control function entity; and sending, by the session management function entity, the access network type corresponding to the second network to the terminal, wherein the access network type corresponding to the second network is for redirecting a session of the terminal to the second network, and the second network is a network other than the first network.

17. The method according to claim 16, wherein the method further comprises:
obtaining, by the policy control function entity, a quota of the second network, and determining that the quota of the second network meets the preset condition.

18. The method according to claim 16, wherein the method further comprises:
obtaining, by the policy control function entity, location information of the terminal; and
learning, by the policy control function entity based on the location information of the terminal, that the second network covers a current location of the terminal.

19. The method according to claim 16, wherein the method further comprises:
sending, by the policy control function entity, a request message to the terminal, wherein the request message requests access network type information for a current location of the terminal;
receiving, by the policy control function entity, a response message from the terminal, wherein the response message comprises the access network type information for the current location of the terminal; and
learning, by the policy control function entity based on the access network type information for the current location of the terminal, that the second network covers the current location of the terminal.

20. The method according to claim 16, wherein the method further comprises:
receiving, by the policy control function entity, a first message from the terminal, wherein the first message indicates whether the terminal has detected the second network; and
in response to the policy control function entity determining, based on the first message, that the terminal has detected the second network, sending, by the policy control function entity, a second message to the terminal, wherein the second message instructs the terminal to redirect the session of the terminal to the second network.

\* \* \* \* \*